United States Patent [19]

Oheda et al.

[11] Patent Number: 5,687,221
[45] Date of Patent: Nov. 11, 1997

[54] INFORMATION PROCESSING APPARATUS HAVING SPEECH AND NON-SPEECH COMMUNICATION FUNCTIONS

[75] Inventors: Shigeto Oheda, Kamakura; Michihiro Mese, Chigasaki; Toshio Kamimura, Fujisawa; Yoshihiko Kunimori, Hiratsuka; Shunichi Itoh, Fujisawa; Tsukasa Hasegawa, Hiratsuka; Tsukasa Yamauchi, Yokohama, all of Japan

[73] Assignee: Hitachi, Ltd., Tokyo, Japan

[21] Appl. No.: 301,990

[22] Filed: Sep. 9, 1994

[51] Int. Cl.[6] ............................................. H04M 11/00
[52] U.S. Cl. ............................. 379/96; 379/98; 379/93; 379/100; 395/2.67; 395/2.4
[58] Field of Search .................... 379/93, 94, 96, 379/97, 98, 100, 88, 89; 395/2.44, 2.6, 2.67; 381/43, 41, 42, 51, 44; 382/187–189; 345/179, 180, 173–175; 178/18, 19

[56] References Cited

U.S. PATENT DOCUMENTS

| | | | |
|---|---|---|---|
| 4,794,634 | 12/1988 | Torihatu et al. | 379/96 |
| 4,907,274 | 3/1990 | Nomura et al. | 379/100 |
| 5,022,071 | 6/1991 | Mozer et al. | 379/93 |
| 5,283,638 | 2/1994 | Engberg et al. | 379/93 |

FOREIGN PATENT DOCUMENTS

| 1-176143 | 7/1989 | Japan . |
|---|---|---|
| 4-63044 | 2/1992 | Japan . |

OTHER PUBLICATIONS

*Byte*, "Talk to Your Computer" by W.S. Meisel, Oct. 1993.
*Byte*, "Even As We Speak", by J.J. Lazzaro, Apr. 1992.
*Interface*, "ISDN, BC Information Element (specified in Q.931) Has Non–Speech/speech Identifier", Jun. 1992.
*Byte*, "Pen Computing Catches On", by D. Mezick, Oct. 1993.

*Primary Examiner*—Curtis Kuntz
*Assistant Examiner*—Stephen Palan
*Attorney, Agent, or Firm*—Antonelli, Terry, Stout & Kraus, LLP.

[57] ABSTRACT

An information processing apparatus having speech and non-speech communication functions for communicating with another party in a non-speech mode in which data information is transferred and communicating with another party in a speech mode in which voice information is transferred. The information processing apparatus includes a speech and non-speech communication detecting apparatus for detecting whether the other party communicates with the information processing apparatus in a speech mode or a non-speech mode and transferring speech and non-speech data between the information processing apparatus and the other party, a non-speech communication unit for receiving non-speech data from the speech and non-speech communication detecting apparatus and supplying non-speech data to the speech and non-speech communication detecting apparatus when the non-speech mode has been detected, and a voice recognizing unit for converting voice information included in speech data from the speech and non-speech communication detecting apparatus into data information when the speech mode has been detected. The invention further includes a voice synthesizing unit for converting data information into speech data including voice information and supplying the speech data to the speech and non-speech communication detecting apparatus when the speech mode has been detected.

14 Claims, 11 Drawing Sheets

INFORMATION PROCESSING APPARATUS HAVING SPEECH AND NON-SPEECH COMMUNICATION FUNCTIONS

BACKGROUND OF THE INVENTION

The present invention is related to an information processing apparatus having a non-speech communication function through which data information other than voice information are communicated in non-speech mode. More particularly, the present invention is related to an information processing apparatus having speech and non-speech communication functions for detecting whether another party with whom communication is to be established can communicate with the information processing apparatus in a speech or a non-speech mode and transferring speech or non-speech data between the information processing apparatus and the other party based on the detection.

Generally, information processing apparatuses such as a portable information processing terminal and an electronic digital notebook has only non-speech communication apparatus by which communication is made in a non-speech mode, while speech apparatuses such as a telephone has only communications apparatus by which communication is made in a speech mode.

Conventionally, data information is communicated between information processing apparatuses having only non-speech communications apparatus and voice information is communicated between voice communications apparatuses having speech communications apparatus. However, communication between an information processing apparatus and a voice communications apparatus has not been addressed, making it impossible for the information processing apparatus having only non-speech communications apparatus to transfer information to the voice communications apparatus having only speech communications apparatus and vice-versa.

It is necessary, therefore, for the communication of voice information between the non-speech communications apparatus and the speech communications apparatus to provide the non-speech communications apparatus with some speech communications apparatus.

As disclosed in Japanese Non-examined Patent Publication No. 4-63044, for an information processing apparatus to be able to communicate voice information with the other party who communicates in a speech mode, special hardware is required. This special hardware may take the form of, for example, a handset equivalent to the speech communication apparatus of the voice communications apparatus. Such a handset would be capable of voice information communication. However, such a handset presents a structural problem of increasing the weight and size of an information processing apparatus as compared with an information processing apparatus having only non-speech communications apparatus.

An information processing apparatus is also disclosed in Japanese Non-examined Patent Publication No. 1-176143, that converts data information coming from another party into voice information to be reproduced. In this information processing apparatus, data information can be sent to the other party, while converting the data information into voice information to be reproduced.

The above-mentioned information processing apparatus provides hardware for the receipt of voice information without providing hardware equivalent to speech communications apparatus for the transmission of non-speech information. Thus, in this case, the other party is limited to those apparatuses which perform communication in a non-speech mode. Therefore, it is impossible to mutually communicate voice information with the other party that communicates in a speech mode.

SUMMARY OF THE INVENTION

It is therefore an object of the present invention to provide an information processing apparatus having a speech and non-speech communication function for transferring speech or non-speech information between the information processing apparatus and another party depending on whether the other party can communicate in a speech or a non-speech mode.

In carrying out the invention and according to one aspect thereof, there is provided a speech and non-speech communication detecting apparatus for detecting whether another party can communicate with the information processing apparatus in a speech mode or a non-speech mode and transferring speech and non-speech data between the information processing apparatus and said another party, a non-speech communication unit for receiving non-speech data from said speech and non-speech communication detecting apparatus and supplying non-speech data entered from an input device to the speech and non-speech communication detecting apparatus when the non-speech mode has been detected, a voice recognizing unit for converting voice information included in speech data from the speech and non-speech communication detecting apparatus into data information when the speech mode has been detected, and a voice synthesizing unit for converting data information entered from the input device into speech data and supplying the speech data to the speech and non-speech communication detecting apparatus when the speech mode has been detected.

According to another aspect of the invention there is provided an information processing apparatus comprising communication network control apparatus for controlling connection with another party, non-speech communication apparatus for making communication in a non-speech mode, input apparatus for entering data information and a display for displaying the data information. The above-mentioned communication network control apparatus determines whether the other party can communicate in a speech of non-speech mode.

The information processing apparatus further comprises voice recognizing apparatus for converting voice information coming from the other party into data information, voice synthesizing apparatus for converting the data information entered by the above-mentioned input apparatus into voice information, and connection switching apparatus for connecting the above-mentioned communication network control apparatus with the above-mentioned non-speech communication apparatus via the above-mentioned voice recognizing apparatus and voice synthesizing apparatus if the above-mentioned communication network control apparatus has determined that the other party can communicate in a speech mode and directly connecting the communication network control apparatus with the above-mentioned non-speech communication apparatus if the above-mentioned communication network control apparatus has determined that the other party can communicate in a non-speech mode.

The information processing apparatus according to the invention may include communication information storage apparatus for storing voice information and/or data information. The above-mentioned voice recognizing apparatus stores at least part of voice information coming from the other party into the above-mentioned storage apparatus based on an external instruction to permit the voice information stored in the communication information storage apparatus to be converted into data information based on an external instruction or stores at least part of the converted data information in the communication information storage apparatus based on an external instruction to permit the data information stored in the communication information storage apparatus to be output to the above-mentioned display apparatus in response to an external instruction, thereby implementing an answering capability.

Also, the information processing apparatus according to the invention may be provided with voice reproducing apparatus for reproducing voice information coming from the other party instead of the above-mentioned voice recognizing apparatus. In such an apparatus, the above-mentioned connection switching apparatus connects the above-mentioned communication network control apparatus with the above-mentioned non-speech communication apparatus via the above-mentioned voice synthesizing apparatus and connects the above-mentioned communication network control apparatus with the above-mentioned voice reproducing apparatus if the above-mentioned communication network control apparatus has determined that the other party can communicate in a speech mode. If the above-mentioned communication network control apparatus has determined that the other party can communicate in a non-speech mode, the above-mentioned connection switching apparatus connects the above-mentioned communication network control apparatus with the above-mentioned non-speech communication apparatus directly.

Further, the information processing apparatus according to the invention may be provided with a voice input apparatus for entering voice instead of the above-mentioned voice synthesizing apparatus. In such an apparatus, the above-mentioned connection switching apparatus connects the above-mentioned communication network control apparatus with the above-mentioned non-speech communication apparatus via the above mentioned voice recognizing apparatus and connects the above-mentioned communication network control apparatus with the above-mentioned voice input apparatus if the above-mentioned communication network control apparatus has determined that the other party can communicate in a speech mode. If the above-mentioned communication network control apparatus has determined that the other party can communicate in a non-speech mode, the above-mentioned connection switching apparatus connects the above-mentioned communication network control apparatus with the above-mentioned non-speech communication apparatus directly.

In the information processing apparatus according to the invention, the above-mentioned communication network control apparatus determines whether the other party can communicate in a speech mode or a non-speech mode when a call is originated from the information processing apparatus or a call terminates from the other party.

If the above-mentioned connection switching apparatus connects the above-mentioned communication network control apparatus with the above-mentioned non-speech communication apparatus directly. Than the above-mentioned communication network control apparatus has determined that the other party can communicate in a non-speech mode.

Thus, data information can be mutually communicated with the other party who makes communication in a non-speech mode.

Also the above-mentioned connection switching apparatus connects the above-mentioned communication network control apparatus with the above-mentioned non-speech communication apparatus via the above-mentioned voice recognizing apparatus and voice synthesizing apparatus if the above-mentioned communication network control apparatus has determined that the other party can communicate in a speech mode.

Consequently, the above-mentioned voice recognizing apparatus converts voice information coming from the other party into data information and the above-mentioned voice synthesizing apparatus converts data information entered via the input apparatus into voice information, so that voice information can be mutually communicated with the other party who makes communication in a speech mode.

BRIEF DESCRIPTION OF THE DRAWINGS

The present invention will be more apparent from the following detailed description, when taken in conjunction with the accompanying drawings, in which.

DETAILED DESCRIPTION OF THE PREFERRED EMBODIMENTS

This invention will be described in further detail by way of example with reference to the accompanying drawings.

Now, referring to FIGS. 1 through 3, the information processing apparatus practiced as a first preferred embodiment of the invention will be described.

Figure 1:
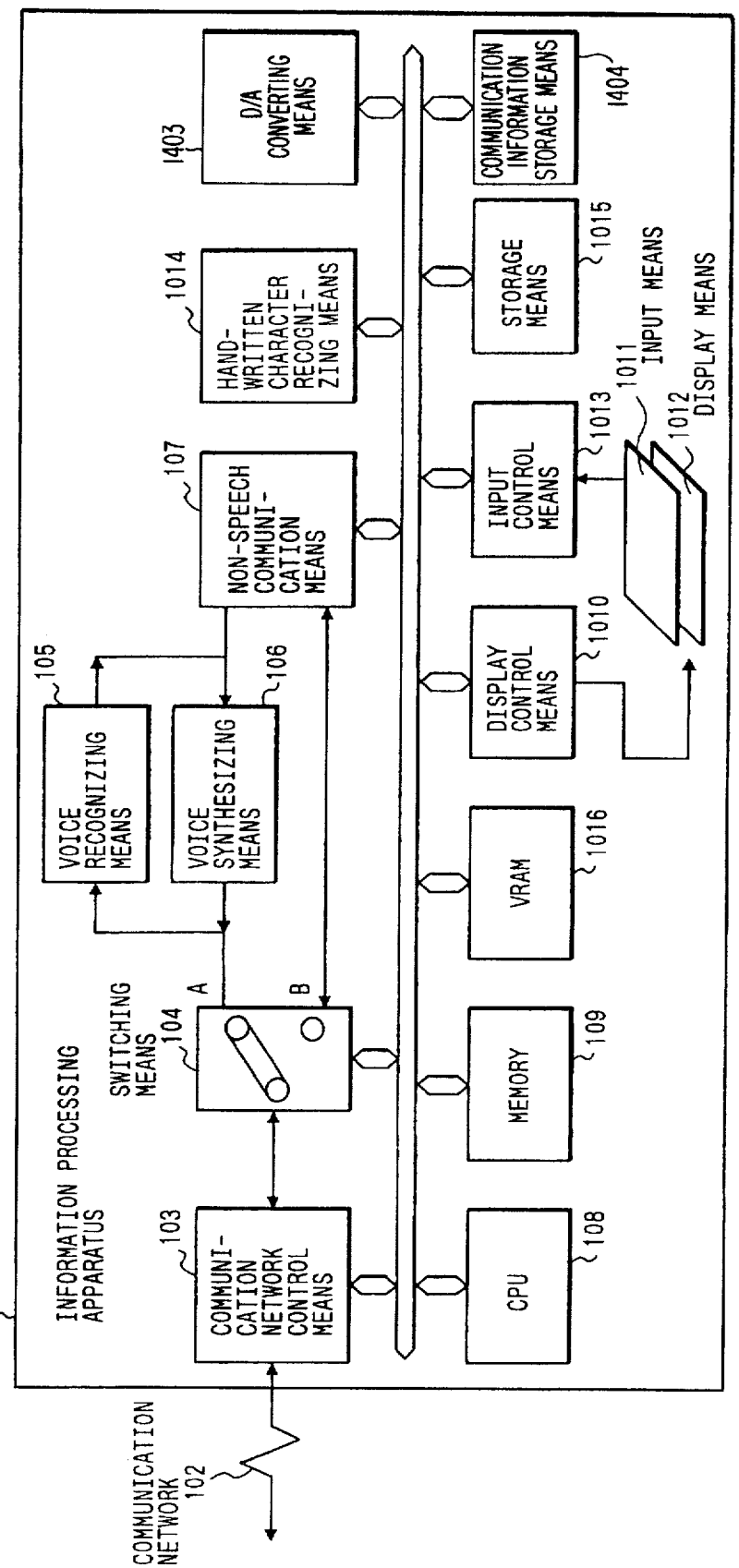
FIG. 1 is a block diagram illustrating an overall construction of the information processing apparatus practiced as an embodiment of the invention.

FIG. 1 is a block diagram illustrating an overall constitution of the information processing apparatus practiced as the first embodiment of the invention.

Referring to FIG. 1, reference numeral 101 indicates the information processing apparatus such as a personal computer, a portable information processing terminal or an electronic notebook computer; reference numeral 102 indicates a communication network such as a telephone network, ISDN or cellular radio network; reference numeral 103 indicates communication network control apparatus providing interface between the communication network and the information processing apparatus; reference numeral 104 indicates switching apparatus; reference numeral 105 indicates voice recognizing apparatus; reference numeral 106 indicates voice synthesizing apparatus; and reference numeral 107 indicates non-speech communication apparatus such as a modem or an input port.

Reference numeral 108 indicates a central processing unit (CPU) for controlling the information processing apparatus 101 in its entirety; reference numeral 109 indicates memory such as RAM and ROM; reference numeral 1010 indicates display control apparatus for displaying data stored in VRAM 1016 onto display apparatus 1012; reference numeral 1011 indicates input apparatus such as an electromagnetic induction tablet, a capacitive tablet or a pressure tablet; reference numeral 1012 indicates display apparatus such as a liquid crystal display; reference numeral 1013 indicates input control apparatus for controlling the input apparatus 1011 to detect information such as input coordinates to be entered in the input apparatus 1011; reference numeral 1014 indicates handwritten character recognizing apparatus for converting input information detected by the input control apparatus into character code information; reference numeral 1015 indicates incorporated or replaceable storage apparatus such as a hard disk or a memory card; and reference numeral 1016 indicates VRAM for storing display data.

In the first embodiment, the display apparatus 1012 and the input apparatus 1011 are unitized in an overlapped manner in which an input locus entered by an input auxiliary apparatus (not shown) such as a pen or a finger is simultaneously displayed (inked) on the display apparatus 1012. However, the embodiment may be constructed otherwise; for example, the input apparatus and the display apparatus may be constructed separately. If the input apparatus 1011 is a keyboard on which character code information is entered, the handwritten character recognizing apparatus 1014 is not required.

In the first embodiment, the information processing apparatus 101 mutually communicates data information or voice information over an analog signal or a digital signal with the other party (the other information processing apparatus or speech apparatus) connected with the communication network 102 over wire or radio.

The communication network control apparatus 103 controls connection with the communication network 102 and determines which of speech mode and non-speech mode the other party can communicate in. The speech mode is herein defined as a mode in which voice information is transferred, while the non-speech mode is defined as a mode in which data information other than voice information is transferred.

A communication mode in which the other party is operating can be determined by a known technology such as disclosed by "ISDN", *Interface* June 1992, pp 178–191. In such technology the determination is made based on attribute information contained in data information coming from the other party, control information for acknowledging the other party, and connection control procedure information.

Figure 2:
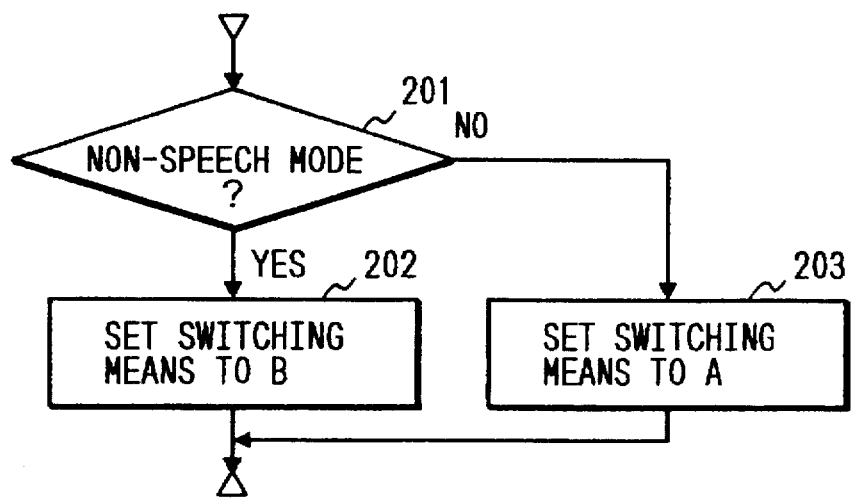
FIG. 2 is a flowchart describing the switching processing in the embodiment of the invention illustrated in FIG. 1.

As shown in a flowchart of FIG. 2, if a communication mode of the other party is found by the communication control apparatus 103 to be the non-speech mode (step 201), the switching apparatus 104 is set to side B in FIG. 1 (step 202) to directly perform communication processing in the non-speech communication apparatus 107. If the communication mode of the other party is found to be the speech mode (step 201), the switching apparatus 104 is set to side A (step 203) to perform communication processing in the non-speech communication apparatus 107 via the voice recognizing apparatus 105 and the voice synthesizing apparatus 106. Thus, if the other party is in the speech mode, the communication network control apparatus 103 is connected to the non-speech communication apparatus 107 via the voice recognizing apparatus 105 and the voice synthesizing apparatus 106. If the other party is in the non-speech mode, the communication network control apparatus is directly connected to the non-speech communication apparatus 107.

The switching processing shown in the flowchart of FIG. 2 is activated by interrupt processing upon detection of a terminating call from the other party by the communication network control apparatus 103. If the information processing apparatus 101 originates a call, the switching processing is activated upon beginning of the communication processing. Actually, the switching processing shown in the flowchart of FIG. 2 is performed by the CPU 108 when it executes a program stored in the memory 109.

The switching processing of the switching apparatus 104 at call origination can be performed in another manner in which the communication mode of the other party is stored in the memory beforehand and the switching apparatus 104 is operated based on the stored communication mode. To be specific, with an information processing apparatus in which a stored destination of an originated call is selected and the call is automatically originated to the selected party, storing the communication mode of the other party makes it possible to determine the communication mode without having the communication network control apparatus 103 determine the mode. This method is especially effective when the party for the originated call can be positively determined, to be one of the speech mode and the non-speech mode.

The voice recognizing apparatus 105 recognizes voice information and converts the recognized voice information into data information (character code information is assumed herein) that can be processed by the non-speech communication apparatus 107. The voice synthesizing apparatus 106 converts the character code information coming from the non-speech communication apparatus into voice information.

For example, if the communication network 102 is an analog telephone network, the voice recognizing apparatus 105 converts the voice information (analog signal) coming from the switching apparatus 104 into the character code information (analog signal) which is sent to the non-speech communication apparatus 107. The non-speech communication apparatus 107 converts the character code information (analog signal) coming from the voice recognizing apparatus 105 into character code information (digital signal) that can be processed by the information processing apparatus practiced as the first embodiment of the invention.

Also, the non-speech communication apparatus 107 converts character code information (digital signal) coming from the handwritten character recognizing apparatus 1014 or the like into another form of character code information (analog signal). The voice synthesizing apparatus 106 converts the character code information (analog signal) into voice information (analog signal).

In another example of communication processing, if the non-speech communication apparatus 107 is constructed so that a digital signal can be entered into it, the voice recognizing apparatus 105 can convert voice information (analog signal) into character code information (digital signal). Further, in such a construction, the character code information converted by the voice recognizing apparatus 105 can be put on a bus directly or via an I/O port for the CPU 108 to process the information.

In still another example of communication processing, if the communication network 102 is a digital communication network such as ISDN, the voice recognizing apparatus 105 converts voice information (digital signal) into character code information (digital signal) and enters the result into the non-speech communication apparatus 107, which is a digital processing circuit such as a serial/parallel converter. And the voice synthesizing apparatus 106 converts the character code information (digital signal) coming from the non-speech communication apparatus 107 into voice information (digital signal).

Voice recognizing technology for implementing the voice recognizing apparatus 105 and voice synthesizing technology for implementing the voice synthesizing apparatus 106 are already known and widely practiced as evident by "Talk to Your Computer" by W. S. Meisel, *Byte*, October 1993, pp 113–120 and "Even As We Speak" by J. J. Lazzaro, *Byte*, April 1992, pp 165–172, so that descriptions of these technologies are omitted herein.

Now, referring to FIGS. 3A–B, an example of operation of the information processing apparatus 101 practiced as the first embodiment of the invention will be described.

Figure 3A:
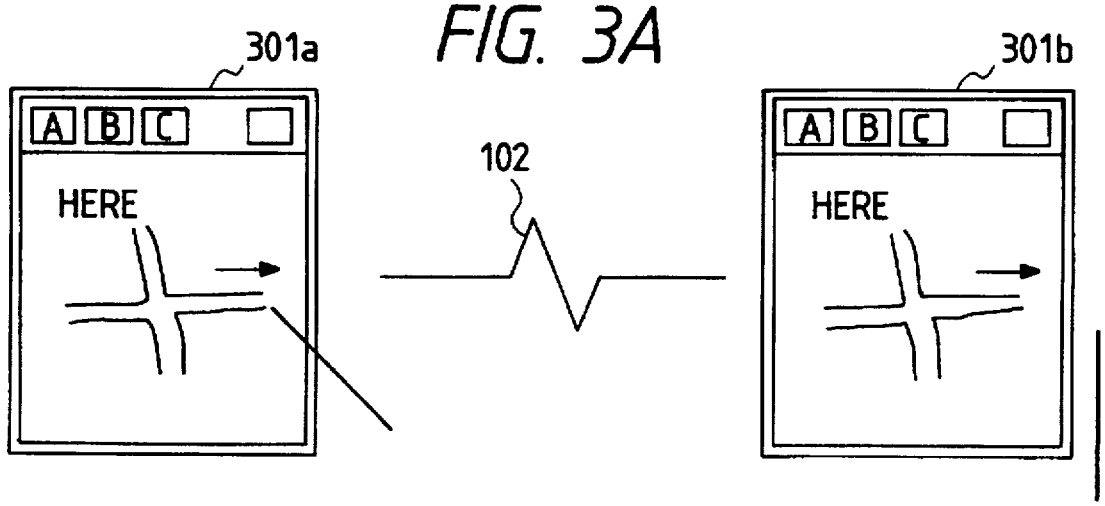
FIGS. 3A-B are diagrams illustrating an operational example of the embodiment of the invention illustrated in FIG. 1.

FIG. 3A shows an example of mutual communication of data information between conventional information processing apparatuses.

Referring to FIG. 3A, information processing apparatuses 301a and 301b are both in a non-speech mode. A real-time telewriting (electronic remote communication by handwriting) capability is implemented by mutually communicating data information about a locus or the like entered from input auxiliary apparatus 303-a and 303-b.

Figure 3B:
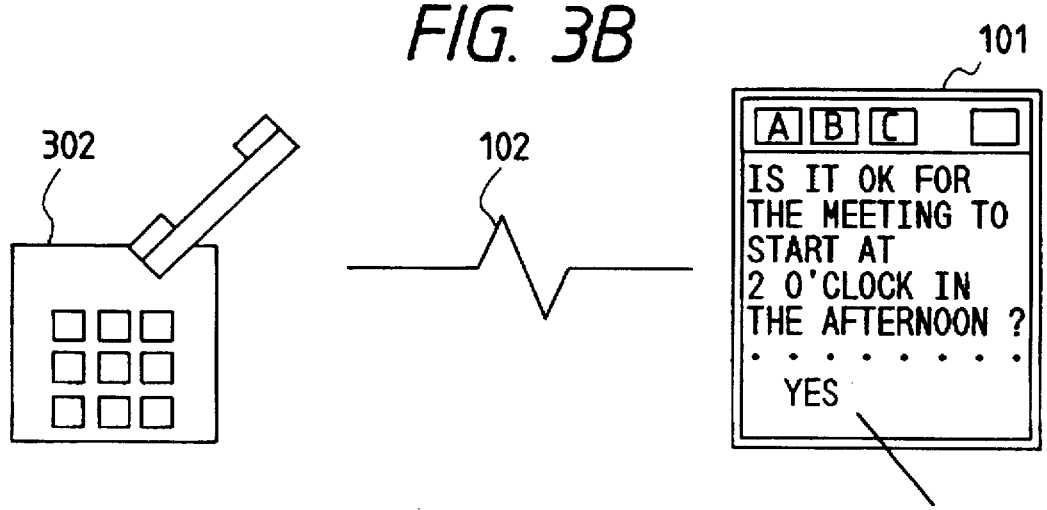

FIG. 3B shows an example of mutual communication of voice data between a speech apparatus 302 and an information processing apparatus 101 practiced as the first embodiment of the invention.

Referring to FIG. 3B, the speech apparatus 302 is in the speech mode, while the information processing apparatus 101 is in the non-speech mode. That is, in the information processing apparatus 101, voice information ("Is it OK for the meeting to start at 2 o'clock in the afternoon?") coming from the speech apparatus 302 is converted by the voice recognizing apparatus 105 into character code information to be displayed on the display apparatus 1012. Subsequently, a handwritten character ("Yes") coming from the input apparatus 1011 is converted by the handwritten character recognizing apparatus 1014 into character code information to be converted by the voice synthesizing apparatus 106 to be transmitted to the speech apparatus 302. The speech apparatus 302 reproduces the converted character code information into a voice ("Yes"). The recognition of handwritten characters may be such as that disclosed in "Pen Computing Catches On" by D. Mezick, *Byte*, October 1993, pp 111–112.

Thus, according to the first embodiment of the invention, the mutual communication of voice information can be implemented between a speech apparatus operating in the speech mode and an information processing apparatus operating in the non-speech mode.

Again, according to the first embodiment, communication can be made in a non-speech mode, hardware such as a handset required for speech-mode communication is not required, thereby reducing the information processing apparatus 101 in weight and size.

In this embodiment, information processing apparatus 101 is assumed to send/receive the information to/from the speech apparatus 302 immediately, but there may be information processing apparatus 101 which needs a little period of time to respond to the information to/from the speech apparatus 302. In this case, a message telling that the information processing apparatus, which the speech apparatus 302 is communicating to is not a speech apparatus (like telephone), and takes a little time to respond to the speech apparatus 302. For this embodiment, communication information storage means 1404 stores the message, and D/A converting means 1403 converts the message to speech signal and sends to the speech apparatus 302 as illustrated in FIG. 1.

The first embodiment also reduces the size of the input apparatus 1011, thereby reducing the information processing apparatus 101 in weight and size.

Further, the first embodiment enables to enter information to be sent to the other party by using the input apparatus 1011 that can enter handwritten characters, so that, if the information processing apparatus 101 is operated in a noisy environment, the information can be transmitted to the other party without being effected by noise, thereby enhancing the reliability in communication.

Still further, the first embodiment enables non-speech communication, thereby preventing the intercept by a third party.

It will be apparent that, in the first embodiment, the voice recognizing apparatus 105 and the voice synthesizing apparatus 106 may be implemented by software entirely or partially or by hardware entirely or partially.

Now, the information processing apparatus practiced as a second embodiment of the invention will be described with reference to FIGS. 4 through 6.

Figure 4:
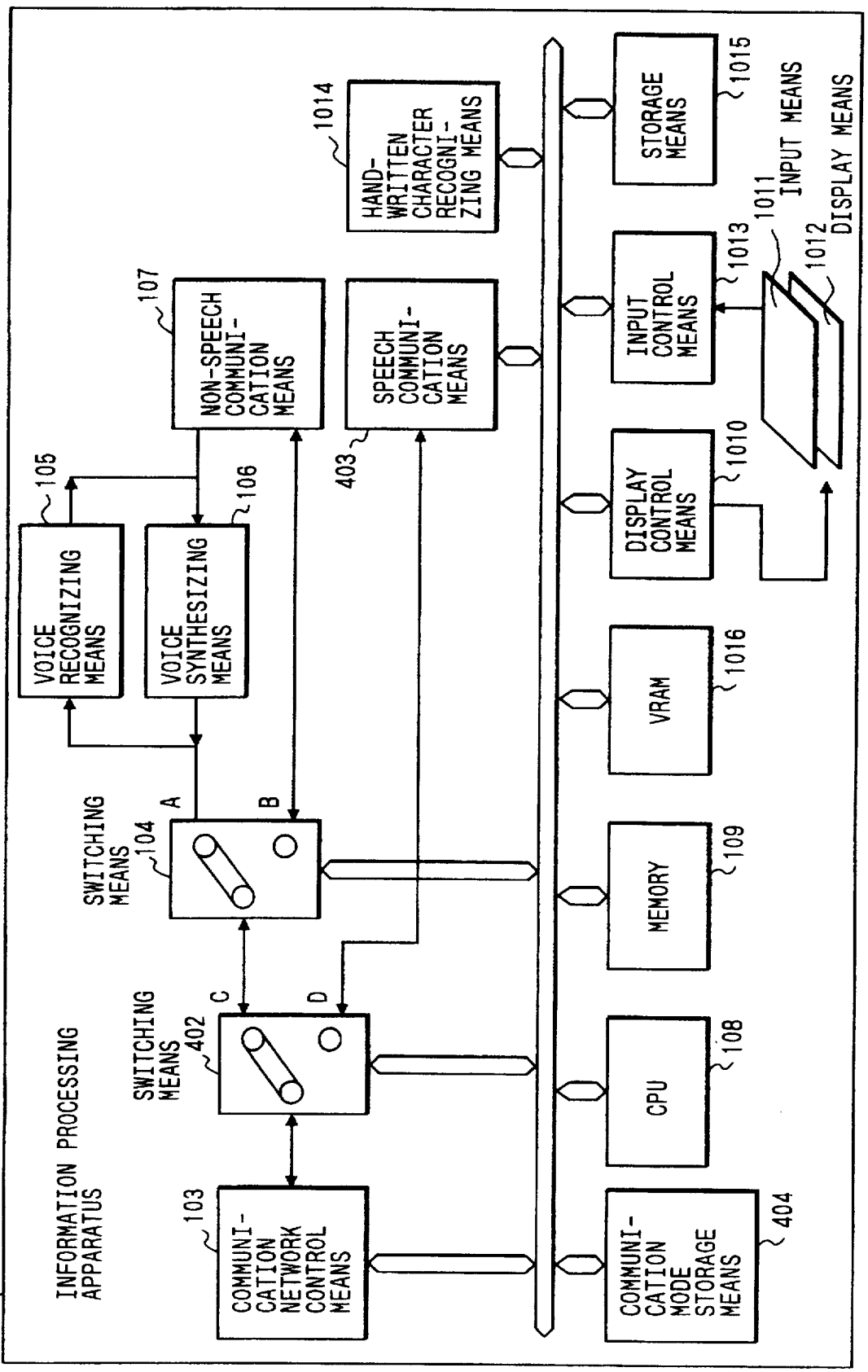
FIG. 4 is a block diagram illustrating the overall construction of the information processing apparatus practiced as another embodiment of the invention.

FIG. 4 is a block diagram illustrating an overall constitution of the information processing apparatus practiced as the second embodiment of the invention.

Referring to FIG. 4, components similar to those previously described with reference to the information processing apparatus 101 practiced as the first embodiment in FIG. 1 are denoted by the same reference numerals.

Reference numeral 401 indicates an information processing apparatus practiced as the second embodiment of the invention; reference numeral 402 indicates a switching apparatus for switching between non-speech communication apparatus 107 and speech communication apparatus 403; reference numeral 403 indicates the speech communication apparatus for making communication in speech mode; and reference numeral 404 indicates communication mode storage apparatus for storing the communication modes. It should be noted that the speech communication apparatus 403 contains a speaker (or an earphone) and a microphone (not shown).

The information processing apparatus 401 is constructed so that a user can enter schedule data by a scheduler application program or the like. The entered schedule data is stored in memory 109 or storage apparatus 1015.

Figure 6:
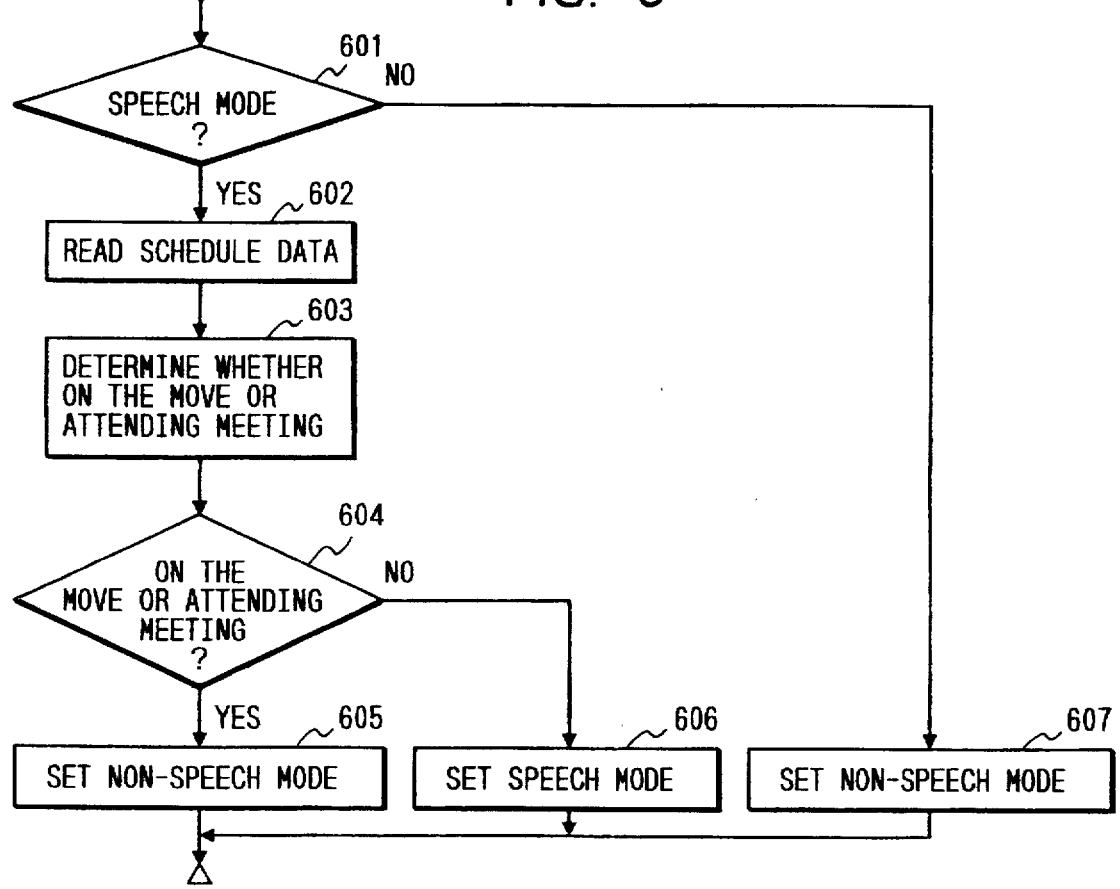
FIG. 6 is a flowchart describing the communication mode setting processing in the embodiment of the invention illustrated in FIG. 4.

The information processing apparatus 401 sets speech mode as shown in a flowchart of FIG. 6 when it originates a call or a call terminates at it from the other party.

That is, if the communication mode of the other party determined by communication network control apparatus 103 is speech mode (step 601), the schedule data is read from the memory 109 or the storage apparatus 1015 (step 602) to determine, based on the read schedule data and current date and time information given from internal clock apparatus, not shown, whether it is difficult for the other party to communicate in speech mode because the other party is on the move, attending a meeting or otherwise unable to communicate in voice (step 603).

If it is difficult for the other party to communicate in speech mode (step 604), non-speech mode is set to the communication mode storage apparatus 404 (step 605). If it is not difficult for the other party to communicate in speech mode (step 604), speech mode is set to the communication mode storage apparatus 404 (step 606).

If the communication mode of the other party determined by the communication control apparatus 103 is non-speech mode (step 601), non-speech mode is set to the communication mode storage apparatus 404 (step 607).

Figure 5:
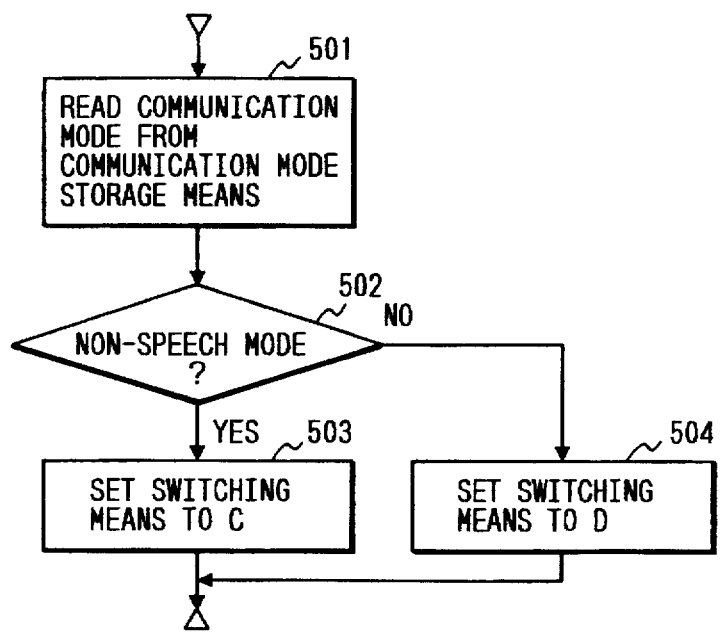
FIG. 5 is a flowchart describing the switching processing in the embodiment of the invention illustrated in FIG. 4.

If the communication mode stored in the communication mode storage apparatus 404 is the non-speech mode (step 502) as shown in the flowchart of FIG. 5, the switching apparatus 402 is set to side C of FIG. 4 (step 503) to be connected to the non-speech communication apparatus 107. If the communication mode stored in the communication mode storage apparatus 404 is the speech mode (step 502), the switching apparatus 402 is set to side D of FIG. 4 to be connected to the speech communication 403 (step 504).

As described in the first embodiment, the switching apparatus 104 is set to side B of FIG. 4 if the communication mode determined by the communication network control apparatus 103 is non-speech mode. The switching apparatus 104 is set to side A of FIG. 4 if the communication mode is speech mode.

It should be noted that the communication mode setting of FIG. 5 and the switching of FIG. 6 are actually performed by CPU 108 when it executes a program stored in the memory 109. Consequently, the CPU 108 first reads the communication mode from the communication mode storage apparatus 404 (step 501) as shown in FIG. 5 to determine if the read mode is non-speech mode or not (step 502).

Thus, according to the second embodiment of the invention, if the communication mode of the other party is speech mode, communication based on the communication mode of the information processing apparatus 401 can be made regardless of the communication mode of the other party.

Again, according to the second embodiment, switching is made for automatic communication in non-speech mode (for example, electronic remote handwritten communication with an electronic pen) if it is determined difficult by supposing the other party's current actions from stored schedule data, to make communication in speech mode because the other party is on the move or during attending a meeting, thereby enhancing ease of use of the information processing apparatus.

In the second embodiment, the communication mode is set in association with the stored schedule data, but the communication mode setting is not by any apparatus limited thereto. For example, it is also possible to set the communication mode by user instruction or in association with current time information.

In FIG. 4, providing also the speech communication apparatus 403 with the switching apparatus 104, the voice recognizing apparatus 105 and the voice synthesizing apparatus 106 provided for the non-speech communication apparatus 107 makes it possible to make mutual communication with the other party set to non-speech mode in speech mode.

Now, the information processing apparatus practiced as a third embodiment of the invention will be described with reference to FIGS. 7 and 8.

Figure 7:
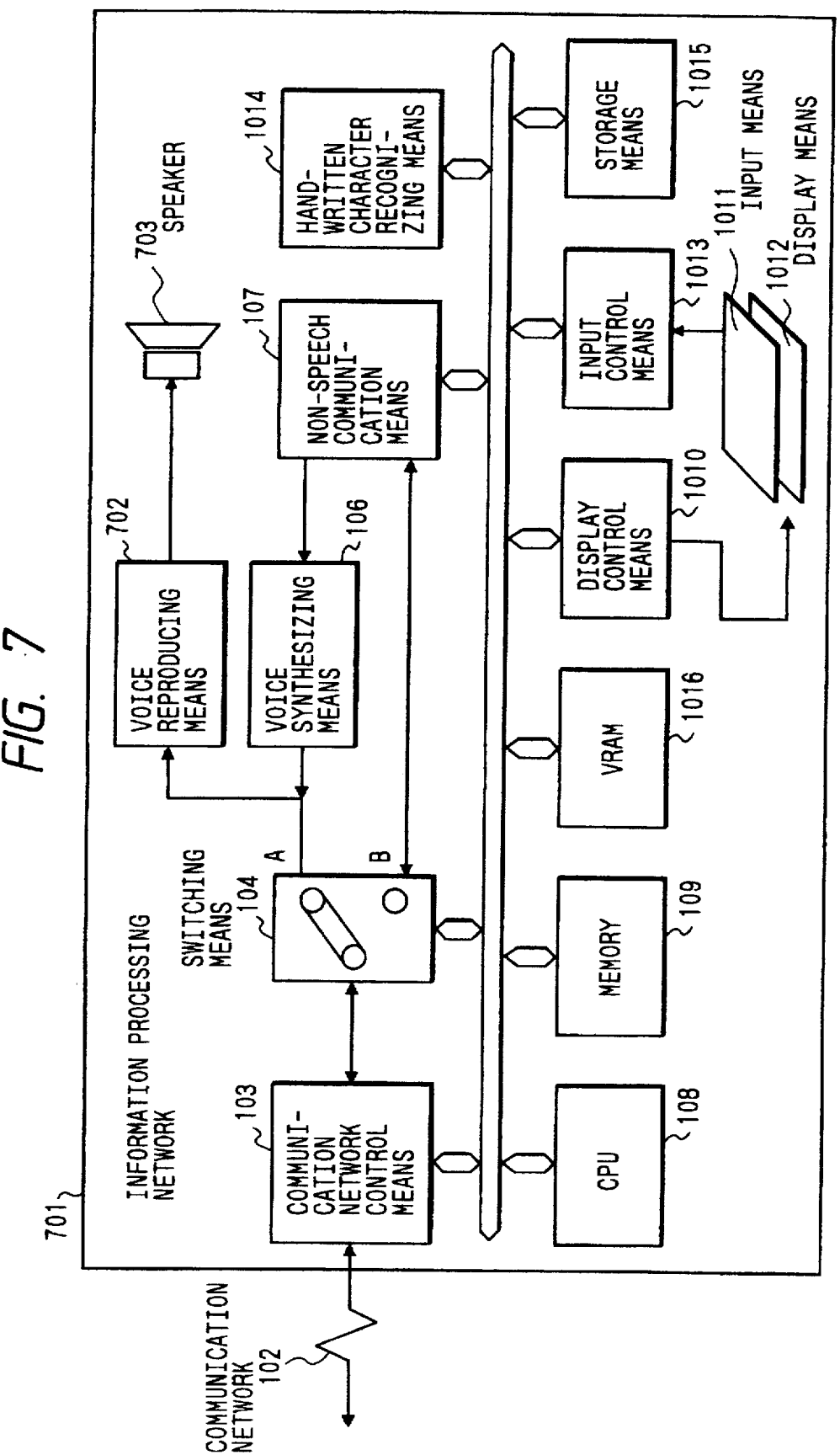
FIG. 7 is a block diagram illustrating the overall construction of the information processing apparatus practiced as another embodiment of the invention.

FIG. 7 is a block diagram illustrating an overall constitution of the information processing apparatus practiced as the third embodiment of the invention.

With reference to FIG. 7, components similar to those previously described with reference to FIG. 1 for the first embodiment are denoted by the same reference numerals.

Referring to FIG. 7, reference numeral 701 indicates an information processing apparatus practiced as the third embodiment of the invention; reference numeral 702 indicates a voice reproducing apparatus for reproducing, in a voice, voice information coming from the other party operating in speech mode; and reference numeral 703 indicates a speaker.

The information processing apparatus 701 can reproduce voice information coming from the other party operating in speech mode and output the reproduced voice through the speaker 703. In this case, the other party operating in speech mode may be either a speech apparatus or that the information processing apparatus 401 of the second embodiment is set to speech mode. Also, the speaker 703 may be an earphone.

Now, referring to FIG. 8, an operation of the information processing apparatus 701 practiced as the third embodiment of the invention will be described by way of example.

Figure 8:
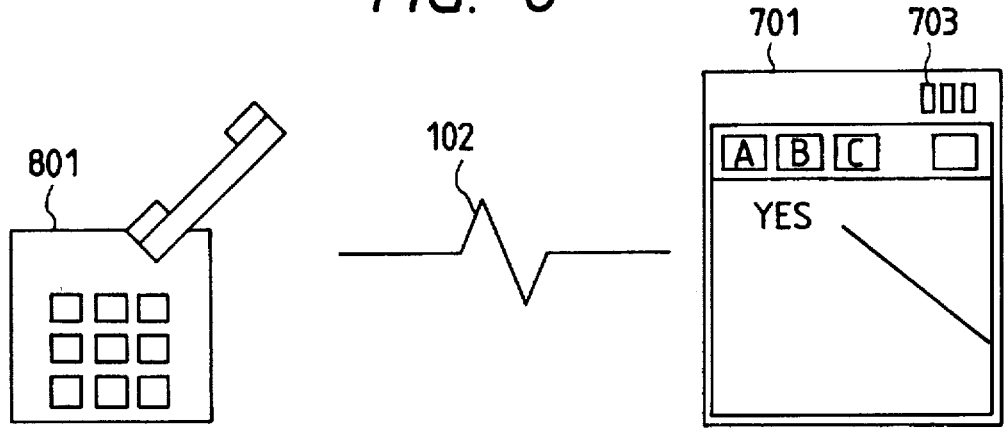
FIG. 8 is a diagram illustrating an operational example of the embodiment of the invention illustrated in FIG. 7.

FIG. 8 shows an example of mutual communication of voice information between a speech apparatus and the information processing apparatus 701.

Referring to FIG. 8, the speech apparatus 801 is operating in speech mode and the information processing apparatus 701 is operating in non-speech mode. That is, in the information processing apparatus 701, voice information ("Is it OK for the meeting to start at 2 o'clock in the afternoon?") coming from the speech apparatus 801 is reproduced by the voice reproducing apparatus 702 (FIG. 7) to be outputted through the speaker 703. Then, written characters ("Yes") entered from input apparatus 1011 (FIG. 7) is converted by handwritten character recognizing apparatus 1014 into character code information to be further converted by voice synthesizing apparatus 106 into voice information. The voice information is transmitted to the speech apparatus 801. Thus, on the speech apparatus 801, the voice information ("Yes") is reproduced as a voice.

Thus, according to the third embodiment of the invention, voice information coming from the other party is reproduced as a voice without change, and information to be sent to the other party is voice information obtained by converting character code information entered from the input apparatus 1011 into the voice information, so that, even if the information processing apparatus 701 is in a noisy environment in which it is difficult to enter voice information clearly, the voice information based on the character code information can be correctly transmitted to the other party, thereby enhancing the reliability in communication.

It will be apparent that, although the third embodiment employs the voice reproducing apparatus 702 and the speaker 703 to reproduce voice information as a voice, the voice recognizing apparatus 105 (FIG. 1) may be added to this setup for selection between voice reproduction and character reproduction.

Now, an information processing apparatus practiced as a fourth embodiment of the invention will be described with reference to FIG. 9.

Figure 9:
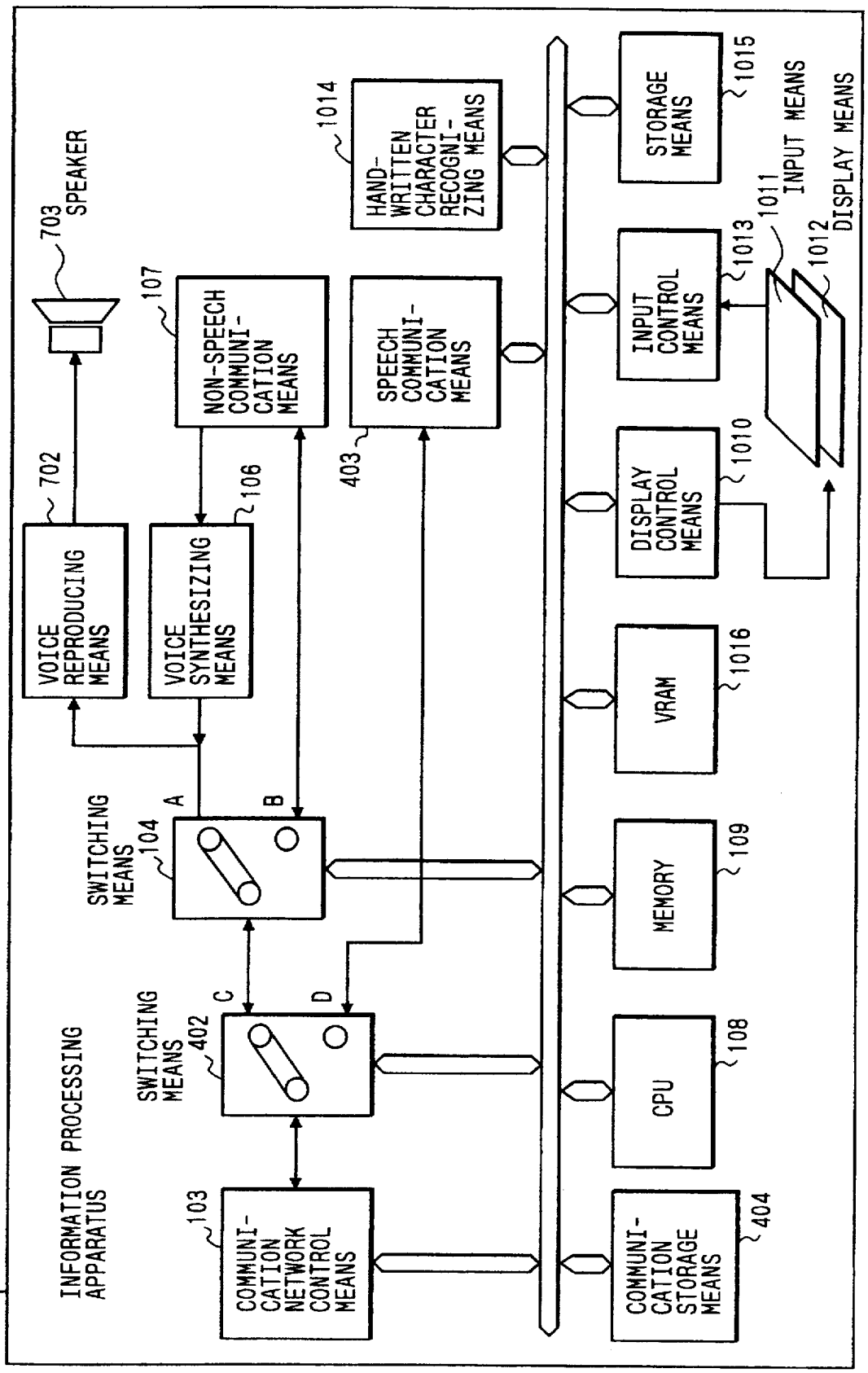
FIG. 9 is a block diagram illustrating the overall construction of the information processing apparatus practiced as another embodiment of the invention.

FIG. 9 is a block diagram illustrating an overall construction of the information processing apparatus practiced as the fourth embodiment of the invention.

With reference to FIG. 9, components similar to those previously described with reference to FIG. 1 for the information processing apparatus 101 of the first embodiment and FIG. 4 for the information processing apparatus 401 of the second embodiment are denoted by the same reference numerals.

In the information processing apparatus 901, the non-speech mode is set to a communication mode storage apparatus 404 if the other party is determined by a communication network control apparatus 103 to be operating in the speech mode and if it is determined to be difficult to make communication in speech mode as described in the second embodiment. If it is determined that the communication in speech mode is not difficult, speech mode is set. If the communication mode of the other party determined by the communication network control apparatus 103 is non-speech mode, non-speech mode is set.

As described in the second embodiment, switching apparatus 402 is set to side D of FIG. 9 if the communication mode stored in the communication mode storage apparatus 404 is speech mode; it is set to side C of FIG. 9 if the communication mode is non-speech mode.

As described in the first embodiment, the switching apparatus 104 is set to side B of FIG. 4 if the communication mode of the other party determined by the communication network control apparatus 103 is non-speech mode; it is set to side A of FIG. 4 if the communication mode is speech mode.

For mutual communication with the other party set to speech mode, voice information coming from the other party is reproduced as a voice without change as described in the above-mentioned third embodiment; information to be sent to the other party is character code information entered from input apparatus 1011 and converted into voice information.

Consequently, according to the fourth embodiment, even if the non-speech mode is set to the communication mode storage apparatus 404, voice information coming from the other party operating in the speech mode is reproduced as a voice without change and character code information entered from the input apparatus 1011 is converted into voice information to be sent to the other party, so that, even if the information processing apparatus 901 is in a noisy environment in which it is difficult to enter voice information clearly, the voice information based on the character code information can be correctly transmitted to the other party, thereby enhancing the reliability in communication.

Further, according to the fourth embodiment, in mutual communication with the other party set to speech mode, voice information coming from the other party is always reproduced as a voice regardless of the communication mode stored in the communication mode storage apparatus 404, thereby assuring operator integrity as well as enhancing ease of use.

It will be apparent that, although the fourth embodiment employs the voice reproducing apparatus 702 and the speaker 703 to reproduce voice information as a voice, the voice recognizing apparatus 105 (FIG. 1) may be added to this setup for selection between voice reproduction and character reproduction.

It will also be apparent that the speaker 703 may be a speaker contained in the speech communication apparatus 403.

Now, the information processing apparatus practiced as a fifth embodiment of the invention will be described with reference to FIGS. 10 and 11.

Figure 10:
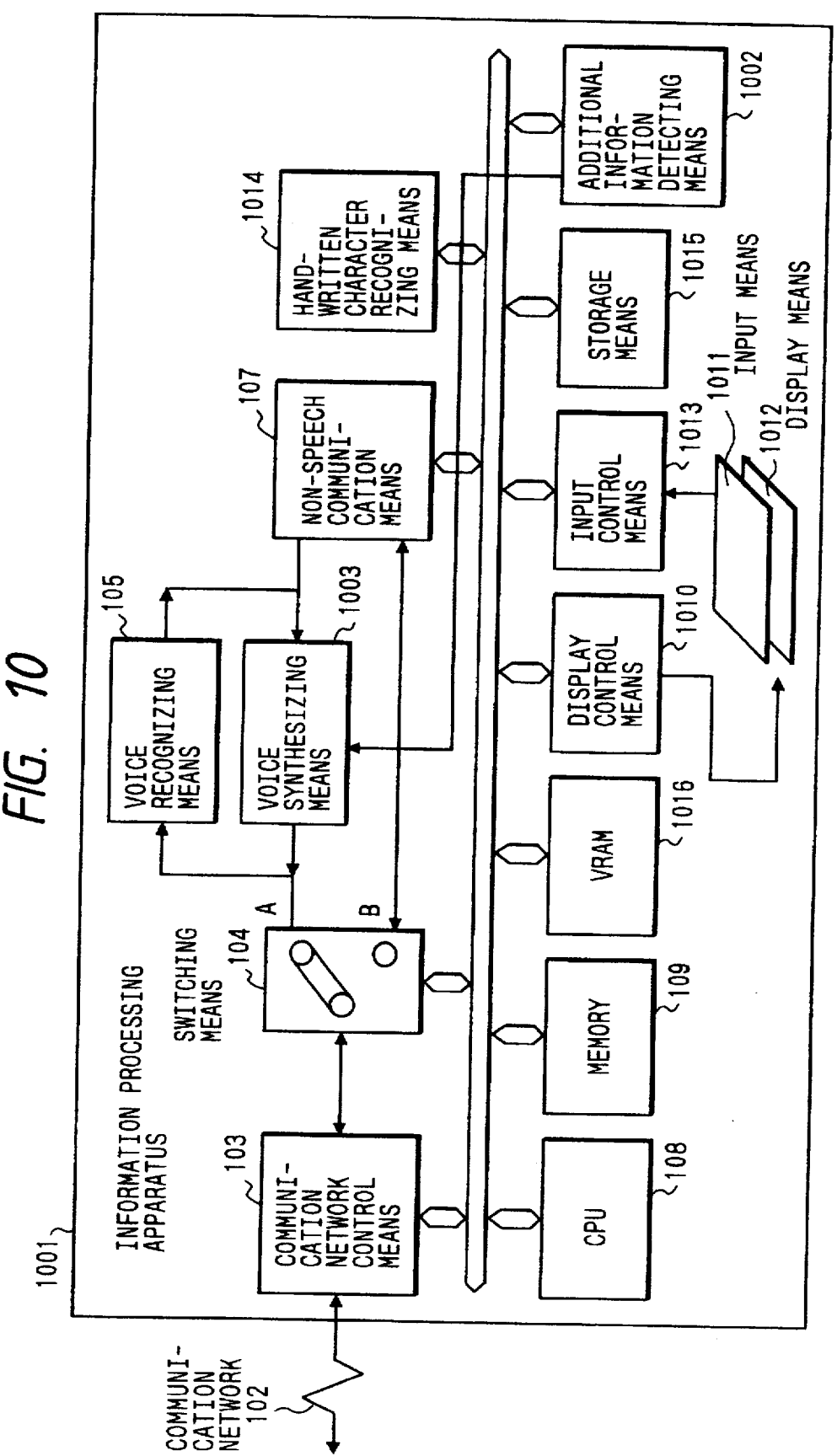
FIG. 10 is a block diagram illustrating the overall construction of the information processing apparatus practiced as another embodiment of the invention.

FIG. 10 is a block diagram illustrating an overall constitution of the information processing apparatus practiced as the fifth embodiment of the invention.

With reference to FIG. 10, components similar to those previously described with reference to the information processing apparatus 101 of FIG. 1 are denoted by the same reference numerals.

Referring to FIG. 10, reference numeral 1001 indicates the information processing apparatus practiced as the fifth embodiment of the invention; reference numeral 1002 indicates additional information detecting apparatus for detecting additional information such as writing pressure, tilt angle and height of an electronic pen for example used as auxiliary input apparatus for input apparatus 1011; and reference numeral 1003 indicates voice synthesizing apparatus for changing voice attributes such as tune, quality and volume of voice information to be outputted according to at least one piece of the additional information detected by the additional information detecting apparatus 1002.

It will be apparent that the additional information detecting apparatus 1002 may be contained in input control apparatus 1013. An operation of the fifth embodiment will be described by way of example with reference to FIG. 11.

The additional information detecting apparatus 1002 detects a writing pressure of the auxiliary input apparatus for example. Referring to FIG. 11, an upper graph indicates an example of a temporal variation of the writing pressure of the auxiliary input apparatus.

The voice synthesizing apparatus 1003 converts character code information to be transmitted to the other party into voice information and, at the conversion, varies a volume of the resultant voice information according to a writing pressure value detected by the additional information detecting apparatus 1002. Referring to FIG. 11, a middle graph indicates an example of a temporal variation of the volume corresponding to the variation in writing pressure and the lower graph indicates an example of a temporal variation of the average volume varied by the voice synthesizing apparatus 1003 according to the writing pressure.

Figure 11:
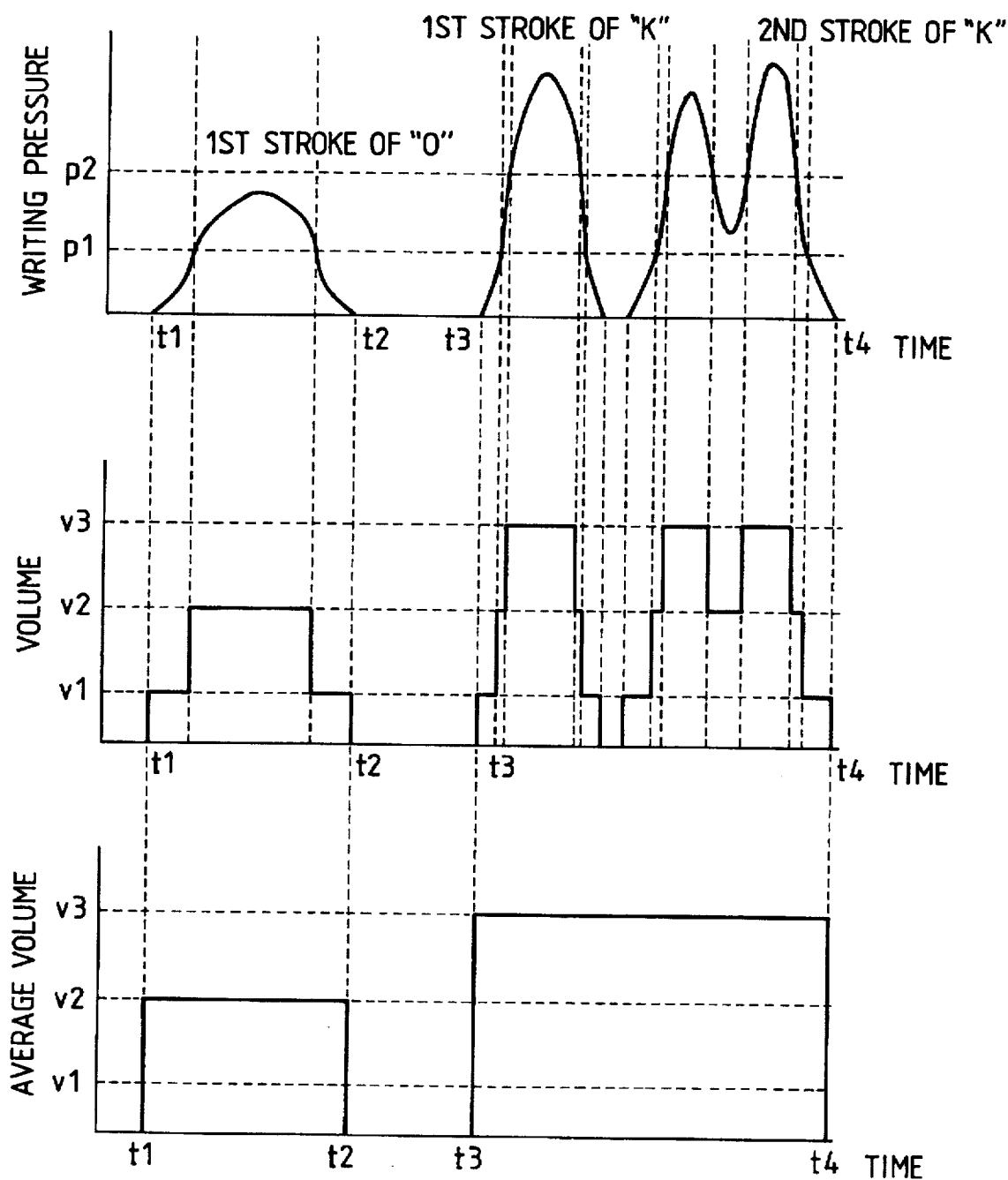
FIG. 11 is a diagram illustrating an operational example of the voice synthesizing apparatus in the embodiment of the invention illustrated in FIG. 10.

Referring to FIG. 11, if the writing pressure is zero, the voice synthesizing apparatus 1003 changes the volume to zero; if the writing pressure is over zero and below p1, the voice synthesizing apparatus 1003 changes the volume to v1 however the average volume output may be set to v2; if the writing pressure is over p1 and below p2, the voice synthesizing apparatus 1003 changes the volume to v2; and if the writing pressure exceeds p2, the voice synthesizing apparatus 1003 changes the volume to v3, however, the average volume output maybe set to v3.

Thus, according to the writing pressure, the volume can be changed in three steps (four steps including the zero level). That is, handwritten character information obtained by relatively strongly pressing the auxiliary input apparatus against the input apparatus is transmitted to the other party as voice information having a relatively high volume; handwritten character information obtained by relatively lightly pressing the auxiliary input apparatus against the input apparatus is transmitted as voice information having a relatively low volume.

As described above and according to the fifth embodiment, the sound attributes of voice information to be transmitted to the other party can be varied according to the additional information by the voice synthesizing apparatus 1003, so that the other party can transfer clearly heard voice information, thereby reducing listening error and enhancing the reliability in communication.

The above-mentioned setup may also be so that, according to the additional information, the voice synthesizing apparatus 1003 can select whether to vary the sound attributes of voice information to be transmitted to the other party.

Further, in the fifth embodiment, voice information with its sound attributes varied by the sound synthesizing apparatus 1003 is transmitted to the other party, but the fifth embodiment is also applicable to any information processing apparatus that reproduces a handwritten input result as a voice on the spot.

Now, the information processing apparatus practiced as a sixth embodiment of the invention will be described with reference to FIGS. 12 and 13.

Figure 12:
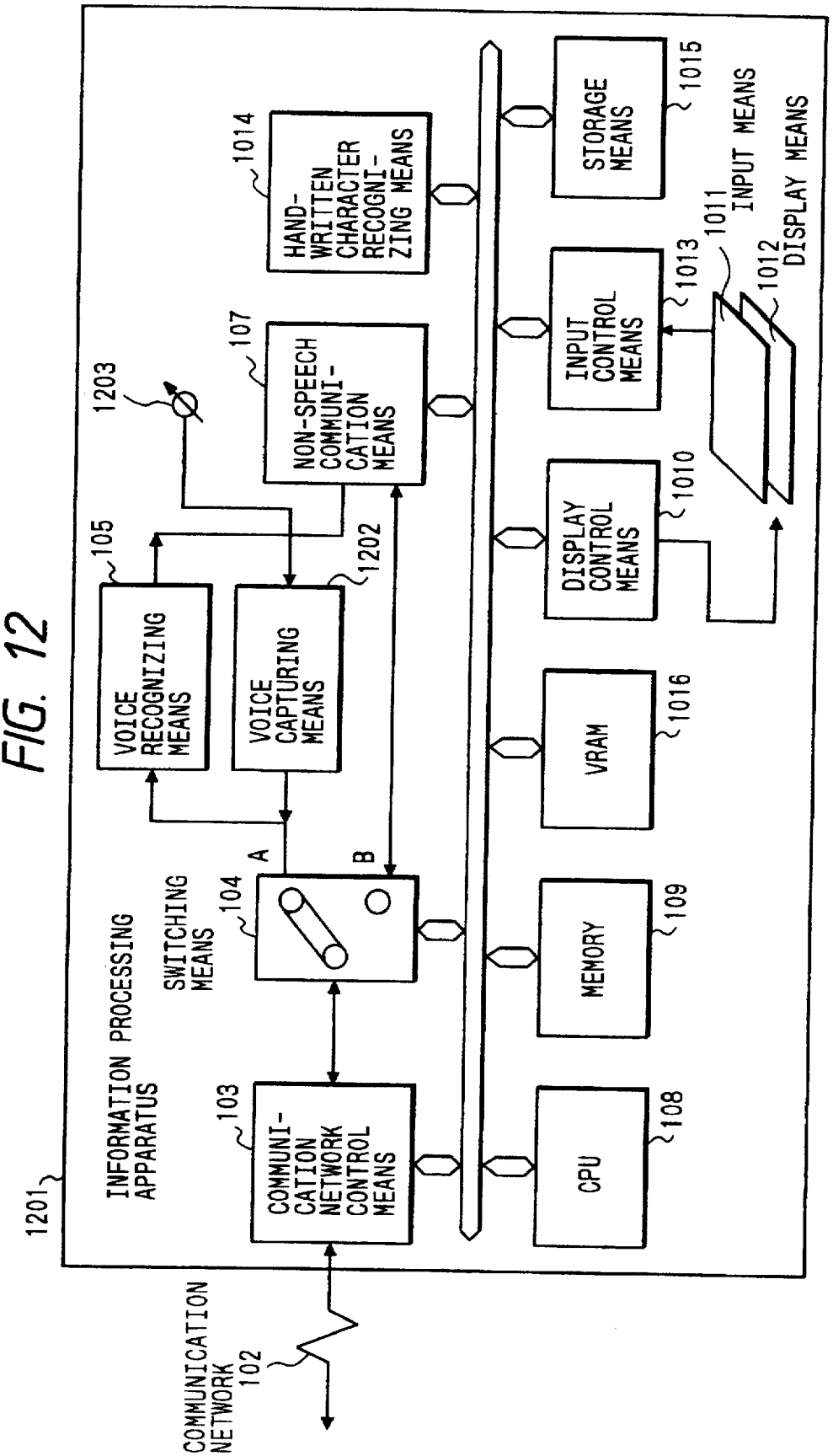
FIG. 12 is a block diagram illustrating the overall construction of the information processing apparatus practiced as another embodiment of the invention.

FIG. 12 is a block diagram illustrating an overall construction of the information processing apparatus practiced as the sixth embodiment of the invention.

With reference to FIG. 12, components similar to those previously described with reference to the information processing apparatus 101 of FIG. 1 are denoted by the same reference numerals.

Referring to FIG. 12, reference numeral 1201 indicates the information processing apparatus practiced as the sixth embodiment of the invention; reference numeral 1202 indicates voice capturing apparatus for converting a voice (an vibration of air) entered from a microphone 1203 into transmittable voice information (an electrical signal) through communication network control apparatus; and reference numeral 1203 indicates the microphone through which the voice is entered.

As described in the above-mentioned first embodiment, switching apparatus 104 is set to side A of FIG. 12 if the other party is determined by the communication network control apparatus 103 to be operating in speech mode.

As described in the first embodiment, voice recognizing apparatus 105 recognizes voice information coming from the other party to convert the recognized voice information into character code information.

Thus, the voice information coming from the other party is converted by the voice recognizing apparatus 105 into character code information to be shown on display apparatus 1012. Information to be transmitted to the other party is one that is obtained by converting, through the voice capturing apparatus 1202, a voice entered from the microphone 1203 into voice information (an electrical signal).

Figure 13:
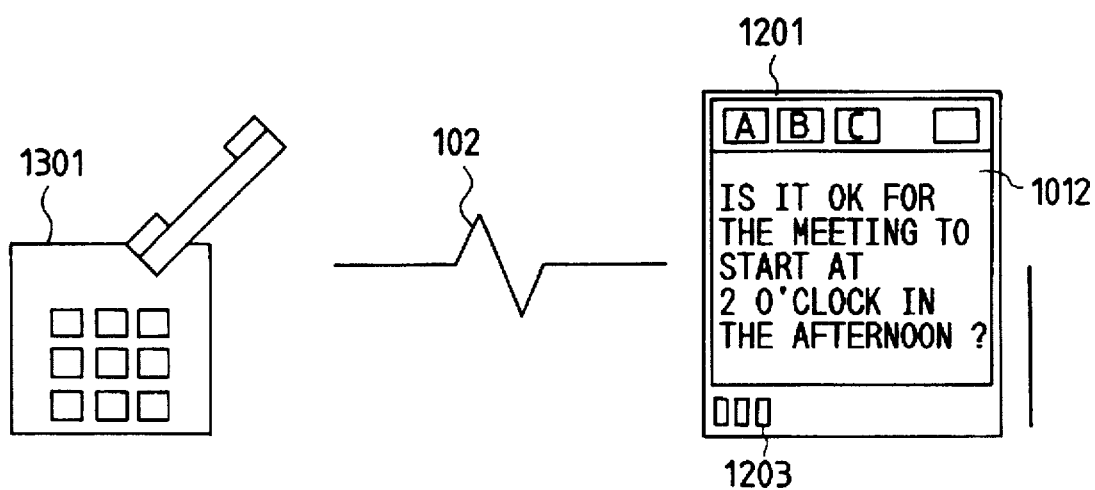
FIG. 13 is a block diagram illustrating an operational example of the embodiment of the invention illustrated in FIG. 12.

Referring to FIG. 13, an operation of the sixth embodiment will be described by way of example.

Referring to FIG. 13, there is shown mutual communication of voice information between the information processing apparatus 1201 of the sixth embodiment and a speech apparatus 1301.

Referring to FIG. 13, the speech apparatus 1301 is set to the speech mode and the information processing apparatus 1201 is set to the non-speech mode. In the information processing apparatus 1201, voice information ("Is it OK for the meeting to start at 2 o'clock in the afternoon?") coming from the speech apparatus 1301 is converted by voice recognizing apparatus 105 into character code information to be shown on display apparatus 1012. Information to be transmitted to the speech apparatus 1301 is voice information (an electrical signal) obtained through voice capturing apparatus 1201 from a voice entered from a microphone 1203.

As described above and according to the sixth embodiment, the information to be transmitted to the other party can be entered as a voice when mutually communicating voice information with the other party operating in speech mode. Correct information can be transmitted when the information processing apparatus 1201 is exposed to heavy vibrations for example and therefore handwritten character recognition accuracy is lowered, thereby enhancing the reliability in communication.

It will be apparent that, although the sixth embodiment transmits voice information to the other party through the voice capturing apparatus 1202 and the microphone 1203, the voice synthesizing apparatus 106 may be added to this setup for selection between this setup and a setup including with the voice synthesizing apparatus.

Lastly, the information processing apparatus practiced as a seventh embodiment of the invention will be described with reference to FIG. 14.

Figure 14:
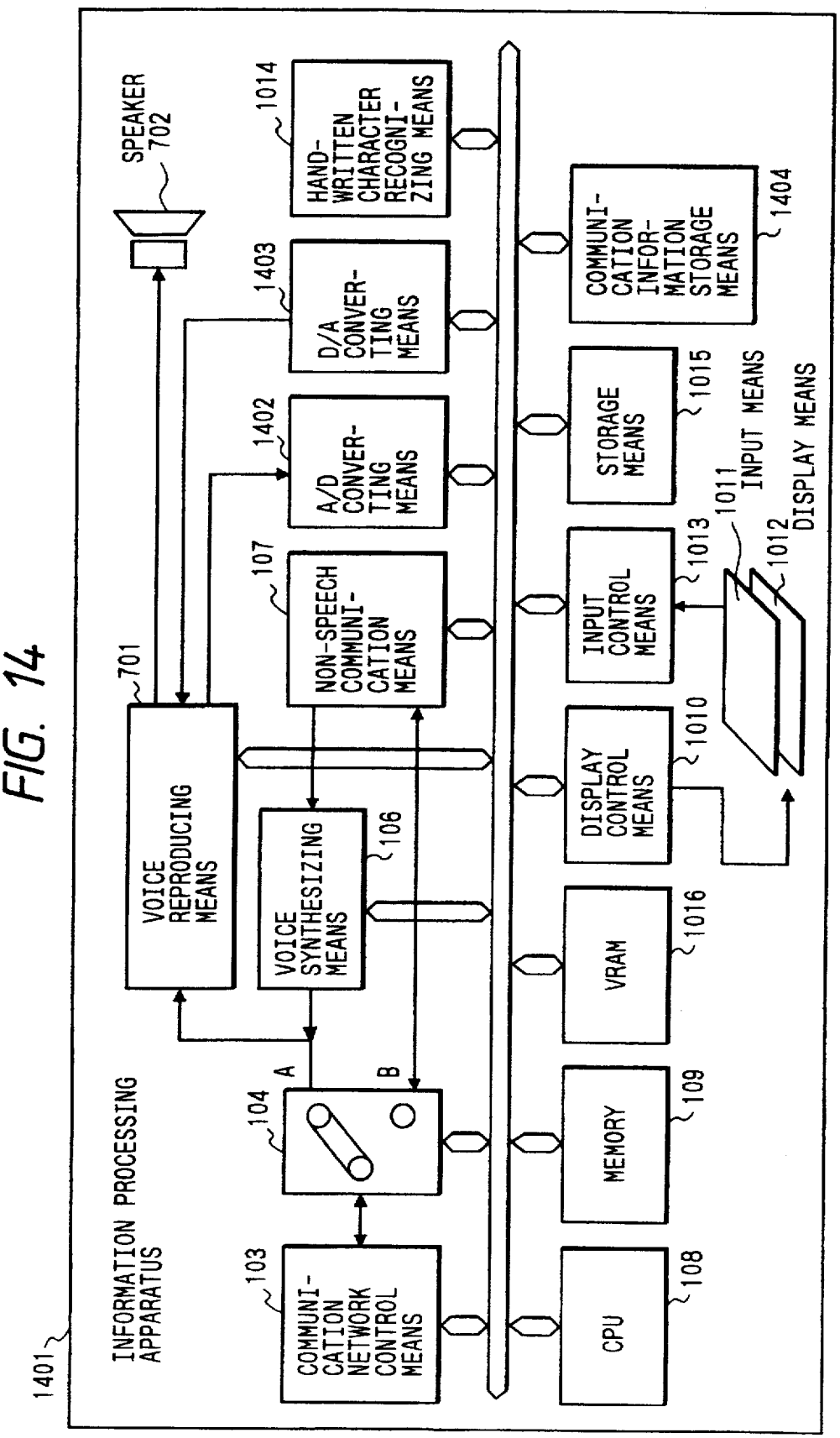
FIG. 14 is a block diagram illustrating the overall construction of the information processing apparatus practiced as another embodiment of the invention.

FIG. 14 is a block diagram illustrating an overall construction of the information processing apparatus practiced as the seventh embodiment of the invention.

With reference to FIG. 14, components similar to those previously described with reference to the information processing apparatus 101 of the first embodiment of FIG. 1 and the information processing apparatus 701 of the third embodiment of FIG. 7 are denoted by the same reference numerals.

Referring to FIG. 14, reference numeral 1401 indicates the information processing apparatus practiced as the seventh embodiment of the invention; reference numeral 1402 indicates A/D converting apparatus for converting an analog signal into a digital signal; and reference numeral 1404 indicates communication information storage apparatus for storing voice information (a digital signal) obtained through the A/D converting apparatus 1402 from voice information (an analog signal) coming from the other party.

When mutually communicating voice information with the other party operating in the speech mode, the information processing apparatus 1401 converts, through the A/D converting apparatus 1402, at least part of the voice information (an analog signal) coming from the other party and stores the resultant voice information (a digital signal) in the communication information storage apparatus 1404. Then, the information processing apparatus 1401 reads the information from the communication information storage apparatus 1404, or the voice information received from the other party, converts the information through D/A converting apparatus 1403 at a given time later than an information reception time, reproduces the resultant analog signal as a voice through the voice reproducing apparatus 702, and outputs the voice through the speaker 703.

As described above and according to the seventh embodiment, the voice information coming from the other party need not be reproduced at the reception time. The reproduction can be delayed until necessary, thereby implementing an automatic message recording capability.

Again, according to the seventh embodiment, the voice information coming from the other party can be reproduced at its reception if necessary (real-time reproduction). The real-time reproduction and the delay reproduction can be matched for confirmation of contents, thereby enhancing the reliability in communication.

It will be apparent that, in the seventh embodiment, the voice information coming from the other party is stored in the communication information storage apparatus 1404, but the voice information may be stored in the memory 109 or the storage apparatus 1015.

In the seventh embodiment, voice information coming from the other party is stored, but the voice recognizing apparatus 105 may be provided instead to store character code information converted by the voice recognizing apparatus 105. Also, both the voice information and the converted character code information may be stored. Such a setup makes it possible to confirm whether there is an error in the character code information converted by the voice recognizing apparatus 105, providing an error correction capability and therefore enhancing ease of use. It will be apparent that the above-mentioned error confirmation and correction capability is effective regardless of the presence or absence of communication apparatus and therefore is applicable to any information processing apparatus having no communication apparatus such as communication network control apparatus and non-speech communication apparatus.

Further, in the seventh embodiment, voice information coming from the other party is stored, but information to be transmitted to the other party may also be stored. In this case, the information to be transmitted may be a voice information (a digital signal) obtained through the voice synthesizing apparatus 106 and the A/D converting apparatus or character code information before being converted by the voice synthesizing apparatus 106. Also, both the voice information and the character code information may be stored. Such a setup makes it possible to confirm whether the character code information has been correctly converted into voice information to be transmitted to the other party.

In the seventh embodiment, the A/D converting apparatus 1402 is connected to the voice reproducing apparatus 702, but the voice capturing apparatus 1202 of the sixth embodiment may be provided to connect the A/D converting apparatus 1402 to the voice capturing apparatus 1202. Also, both the voice reproducing apparatus 702 and the voice capturing apparatus 1202 may be provided to connect the A/D converting apparatus 1402 to both.

Although the above description of the seventh embodiment refers to the case in which a voice signal comes in an analog signal, the voice information may come in a digital signal. In the case of a digital voice signal, the A/D converting apparatus 1402 and the D/A converting apparatus 1403 are not required any more, the voice information (digital signal) being directly stored in the communication information storage apparatus 1404 under control of the CPU 108.

As described and according to the invention, there is provided an information processing apparatus having only non-speech communication apparatus for communication in a non-speech mode, wherein mutual communication of voice information can be made with the other party operating in speech mode without special hardware equivalent to speech communication apparatus for communication in speech mode, thereby enhancing ease of use.

While the present invention has been described in detail and pictorially in the accompanying drawings it is not limited to such details since many changes and modifications recognizable to those of ordinary skill in the art may be made to the invention without departing from the spirit and the scope thereof.

What is claimed is:

1. An information processing apparatus comprising:

communication network control apparatus for controlling connection with another party, said communication network control apparatus determining, based on information received after establishing a connection with said another party, whether said another party is communicating in a speech mode in which voice information is transferred or a non-speech mode in which data information is transferred;

non-speech communication apparatus for transferring data information other than voice information;

input apparatus for entering the data information;

display apparatus for displaying data information;

voice recognizing apparatus for converting voice information coming from said another party into data information;

voice synthesizing apparatus for converting said data information entered from said input apparatus into voice information;

connection switching apparatus for connecting said communication network control apparatus with said non-speech communication apparatus via said voice recognizing apparatus and said voice synthesizing apparatus if said communication network control apparatus determines that said another party is communicating in said speech mode, and for connecting said communication network control apparatus with said non-speech communication apparatus directly if said communication network control apparatus determines that said another party is communicating in non-speech mode; and wherein said input apparatus comprises a handwritten character input apparatus for entering handwritten character information and a handwritten character recognizing apparatus for converting the handwritten character information entered from said handwritten character input apparatus into character code information;

additional information detecting apparatus for detecting additional information attached when handwritten character information is entered from said handwritten character input apparatus;

wherein said voice synthesizing apparatus changes an attribute of voice information to be synthesized according to contents of the additional information detected by said additional information detecting apparatus;

wherein the additional information to be detected by said additional information detecting apparatus is at least a handwriting pressure applied to said handwritten character input apparatus and the voice information attribute to be changed by said voice synthesizing apparatus is at least one of volume, tonal quality and tune of voice.

2. An information processing apparatus comprising:

communication network control apparatus for controlling connection with another party, said communication network control apparatus determining, based on information received after establishing a connection with said another party, whether said another party is communicating in a speech mode in which voice information is transferred or a non-speech mode in which data information is transferred;

non-speech communication apparatus for transferring data information other than voice information;

input apparatus for entering the data information;

display apparatus for displaying data information;

voice recognizing apparatus for converting voice information coming from said another party into data information;

voice synthesizing apparatus for converting said data information entered from said input apparatus into voice information;

connection switching apparatus for connecting said communication network control apparatus with said non-speech communication apparatus via said voice recognizing apparatus and said voice synthesizing apparatus if said communication network control apparatus determines that said another party is communicating in said speech mode, and for connecting said communication network control apparatus with said non-speech communication apparatus directly if said communication network control apparatus determines that said another party is communicating in non-speech mode;

communication information storage apparatus for storing any of voice information and data information;

wherein said voice recognizing apparatus performs one of operation of storing at least part of voice information coming from said another party in said communication information storage apparatus based on an external instruction to convert the voice information stored in said communication information storage apparatus into data information and stores at least part of the converted data information in said communication information storage apparatus based on an external instruction to output the data information stored in said communication information storage apparatus onto said display apparatus; and wherein said input apparatus comprises handwritten character input apparatus for entering handwritten character information and handwritten character recognizing apparatus for converting the handwritten character information entered from said handwritten character input apparatus into character code information;

additional information detecting apparatus for detecting additional information attached when handwritten character information is entered from said handwritten character input apparatus;

wherein said voice synthesizing apparatus changes an attribute of voice information to be synthesized according to contents of the additional information detected by said additional information detecting apparatus;

wherein the additional information to be detected by said additional information detecting apparatus is at least a handwriting pressure applied to said handwritten character input apparatus and the voice information attribute to be changed by said voice synthesizing apparatus is at least one of volume, tonal quality and tune of voice.

3. An information processing apparatus comprising:

communication network control apparatus for controlling connection with another party, said communication network control apparatus determining, based on information received after establishing a connection with said another party, whether said another party is communicating in a speech mode in which voice information is transferred or a non-speech mode in which data information is transferred;

non-speech communication apparatus for communicating in said non-speech mode in which data information other than voice information is transferred;

input apparatus for entering the data information;

display apparatus for displaying data information;

voice reproducing apparatus for reproducing voice information coming from said another party;

voice synthesizing apparatus for converting the data information entered from said input apparatus into voice information;

connection switching apparatus for connecting said communication network control apparatus with said non-speech communication apparatus via said voice synthesizing apparatus and connecting said communication network control apparatus with said voice reproducing apparatus if said communication network control apparatus determines that said another party is communicating in said speech mode, and for connecting said communication network control apparatus with said non-speech communication apparatus directly if said communication network control apparatus determines that said another party is communicating in non-speech mode;

wherein said input apparatus comprises handwritten character input apparatus for entering handwritten character information and handwritten character recognizing apparatus for converting the handwritten character information entered from said handwritten character input apparatus into character code information;

additional information detecting apparatus for detecting additional information attached when handwritten character information is entered from said handwritten character input apparatus;

wherein said voice synthesizing apparatus changes an attribute of voice information to be synthesized according to contents of the additional information detected by said additional information detecting apparatus;

wherein the additional information to be detected by said additional information detecting apparatus is at least a handwriting pressure applied to said handwritten character input apparatus and the voice information attribute to be changed by said voice synthesizing apparatus is at least one of volume, tonal quality and tune of voice.

4. An information processing apparatus comprising:

communication network control apparatus for controlling connection with another party, said communication network control apparatus determining, based on information received after establishing a connection with said another party, whether said another party is communicating in a speech mode in which voice information is transferred or a non-speech mode in which data information is transferred;

non-speech communication apparatus for communicating in said non-speech mode in which data information other than voice information is transferred;

input apparatus for entering the data information;

display apparatus for displaying data information;

voice reproducing apparatus for reproducing voice information coming from said another party;

voice synthesizing apparatus for converting the data information entered from said input apparatus into voice information;

connection switching apparatus for connecting said communication network control apparatus with said non-speech communication apparatus via said voice synthesizing apparatus and connecting said communication network control apparatus with said voice reproducing apparatus if said communication network control apparatus determines that said another party is communicating in said speech mode, and for connecting said communication network control apparatus with said non-speech communication apparatus directly if said communication network control apparatus determines that said another party is communicating in non-speech mode;

communication information storage apparatus for storing any of voice information and data information;

wherein said voice reproducing apparatus stores at least part of voice information coming from said another party in said communication information storage apparatus based on an external instruction to reproduce the voice information stored in said communication information storage apparatus;

wherein said input apparatus comprises handwritten character input apparatus for entering handwritten character information and handwritten character recognizing apparatus for converting the handwritten character information entered from said handwritten character input apparatus into character code information;

additional information detecting apparatus for detecting additional information attached when handwritten character information is entered from said handwritten character input apparatus;

wherein said voice synthesizing apparatus changes an attribute of voice information to be synthesized according to contents of the additional information detected by said additional information detecting apparatus;

wherein the additional information to be detected by said additional information detecting apparatus is at least a handwriting pressure applied to said handwritten character input apparatus and the voice information attribute to be changed by said voice synthesizing apparatus is at least one of volume, tonal quality and tune of voice.

5. An information processing apparatus as defined in claim 1, further comprising:

speech communication apparatus for making communication in said speech mode in which voice information is transferred;

mode storage apparatus for storing any one of speech mode and non-speech mode;

mode setting apparatus for setting any one of speech mode and non-speech mode to said mode storage apparatus; and connection switching apparatus for connecting said communication network control apparatus with said speech communication apparatus if speech mode is set to said mode storage apparatus and for connecting said communication network control apparatus with said non-speech communication apparatus if non-speech mode is set to said mode storage apparatus.

6. An information processing apparatus comprising:

communication network control apparatus for controlling connection with another party, said communication network control apparatus determining, based on information received after establishing a connection with said another party, whether said another party is communicating in a speech mode in which voice information is transferred or a non-speech mode in which data information is transferred;

non-speech communication apparatus for transferring data information other than voice information;

input apparatus for entering the data information;

display apparatus for displaying data information;

voice recognizing apparatus for converting voice information coming from said another party into data information;

voice synthesizing apparatus for converting said data information entered from said input apparatus into voice information;

connection switching apparatus for connecting said communication network control apparatus with said non-speech communication apparatus via said voice recognizing apparatus and said voice synthesizing apparatus if said communication network control apparatus determines that said another party is communicating in said speech mode, and for connecting said communication network control apparatus with said non-speech communication apparatus directly if said communication network control apparatus determines that said another party is communicating in non-speech mode;

speech communication apparatus for making communication in said speech mode in which voice information is transferred;

mode storage apparatus for storing any one of speech mode and non-speech mode;

mode setting apparatus for setting any one of speech mode and non-speech mode to said mode storage apparatus;

connection switching apparatus for connecting said communication network control apparatus with said speech communication apparatus if speech mode is set to said mode storage apparatus and for connecting said communication network control apparatus with said non-speech communication apparatus if non-speech mode is set to said mode storage apparatus;

schedule data storage apparatus for storing schedule data entered from said input apparatus; and timer apparatus for measuring time;

wherein, if said communication network control apparatus determines that said another party is communicating in said speech mode, said mode setting apparatus determines a utilizing situation of said another party based on a time measured by said timer apparatus and the schedule data stored in said schedule data storage apparatus and, according to the determined utilization situation, sets one of said speech mode and said non-speech mode to said mode storage apparatus, and, if said communication network control apparatus determines that said another party is communicating in said non-speech mode, said mode setting apparatus sets non-speech mode to said mode storage apparatus.

7. An information processing apparatus comprising:

communication network control apparatus for controlling connection with another party, said communication network control apparatus determining, based on information received after establishing a connection with said another party, whether said another party is communicating in a speech mode in which voice information is transferred or a non-speech mode in which data information is transferred;

non-speech communication apparatus for transferring data information other than voice information;

input apparatus for entering the data information;

display apparatus for displaying data information;

voice recognizing apparatus for converting voice information coming from said another party into data information;

voice synthesizing apparatus for converting said data information entered from said input apparatus into voice information;

connection switching apparatus for connecting said communication network control apparatus with said non-speech communication apparatus via said voice recognizing apparatus in said voice synthesizing apparatus if said communication network control apparatus determines that said another party is communicating in said speech mode, and for connecting said communication network control apparatus with said non-speech communication apparatus directly if said communication network control apparatus determines that said another party is communicating in a non-speech mode;

communication information storage apparatus for storing any of voice information and data information;

wherein said voice recognizing performs one of operations of storing at least part of voice information coming from said another party in said communication information storage apparatus based on an external instruction to convert the voice information stored in said communication information storage apparatus into data information and stores at least part of the converted data information in said communication information storage apparatus based on an external instruction to output the data information stored in said communication information storage apparatus onto said display apparatus;

speech communication apparatus for making communication in said speech mode in which voice information is transferred;

mode storage apparatus for storing any one of speech mode and non-speech mode;

mode setting apparatus for setting any one of speech mode and non-speech mode to said mode storage apparatus;

connection switching apparatus for connecting said communication network control apparatus with said speech communication apparatus if speech mode is set to said mode storage apparatus and for connecting said communication network control apparatus with said non-speech communication apparatus if non-speech mode is set to said mode storage apparatus;

schedule data storage apparatus for storing schedule data entered from said input apparatus; and timer apparatus for measuring time;

wherein, if said communication network control apparatus determines that said another party is communicating in said speech mode, said mode setting apparatus determines a utilizing situation of said another party based on a time measured by said timer apparatus and the schedule data stored in said schedule data storage apparatus and, according to the determined utilization situation, sets one of said speech mode and said non-speech mode to said mode storage apparatus, and, if said communication network control apparatus determines that said another party is communicating in said non-speech mode, said mode setting apparatus sets non-speech mode to said mode storage apparatus.

8. An information processing apparatus comprising:

communication network control apparatus for controlling connection with another party, said communication network control apparatus determining, based on information received after establishing a connection with said another party, whether said another party is communicating in a speech mode in which voice information is transferred or a non-speech mode in which data information is transferred;

non-speech communication apparatus for communicating in said non-speech mode in which data information other than voice information is transferred;

input apparatus for entering the data information;

display apparatus for displaying data information;

voice reproducing apparatus for reproducing voice information coming from said another party;

voice synthesizing apparatus for converting said data information entered from said input apparatus into voice information;

connection switching apparatus for connecting said communication network control apparatus with said non-speech communication apparatus via said voice synthesizing apparatus and connecting said communication network control apparatus with said voice reproducing apparatus if said communication network control apparatus determines that said another party is communicating in said speech mode, and for connecting said communication network control apparatus with said non-speech communication apparatus directly if said communication network control apparatus determines that said another party is communicating in non-speech mode;

speech communication apparatus for making communication in said speech mode in which voice information is transferred;

mode storage apparatus for storing any one of speech mode and non-speech mode;

mode setting apparatus for setting any one of speech mode and non-speech mode to said mode storage apparatus;

connection switching apparatus for connecting said communication network control apparatus with said speech communication apparatus if speech mode is set to said mode storage apparatus and for connecting said communication network control apparatus with said non-speech communication apparatus if non-speech mode is set to said mode storage apparatus;

schedule data storage apparatus for storing schedule data entered from said input apparatus; and timer apparatus for measuring time;

wherein, if said communication network control apparatus determines that said another party is communicating in said speech mode, said mode setting apparatus determines a utilizing situation of said another party based on a time measured by said timer apparatus and the schedule data stored in said schedule data storage apparatus and, according to the determined utilization situation, sets one of said speech mode and said non-speech mode to said mode storage apparatus, and, if said communication network control apparatus determines that said another party is communicating in said non-speech mode, said mode setting apparatus sets non-speech mode to said mode storage apparatus.

9. An information processing apparatus comprising:

communication network control apparatus for controlling connection with another party, said communication network control apparatus determining, based on information received after establishing a connection with said another party, whether said another party is communicating in a speech mode in which voice information is transferred or a non-speech mode in which data information is transferred;

non-speech communication apparatus for communicating in said non-speech mode in which data information other than voice information is transferred;

input apparatus for entering the data information;

display apparatus for displaying data information;

voice reproducing apparatus for reproducing voice information coming from said another party;

voice synthesizing apparatus for converting said data information entered from said input apparatus into voice information;

connection switching apparatus for connecting said communication network control apparatus with said non-speech communication apparatus via said voice synthesizing apparatus and connecting said communication network control apparatus with said voice reproducing apparatus if said communication network control apparatus determines that said another party is communicating in said speech mode, and for connecting said communication network control apparatus with said non-speech communication apparatus directly if said communication network control apparatus determines that said another party is communicating in non-speech mode;

communication information storage apparatus for storing any of voice information and data information;

wherein said voice reproducing apparatus stores at least part of voice information coming from said another party in said communication information storage apparatus based on an external instruction to reproduce the voice information stored in said communication information storage apparatus;

speech communication apparatus for making communication in said speech mode in which voice information is transferred;

mode storage apparatus for storing any one of speech mode and non-speech mode;

mode setting apparatus for setting any one of speech mode and non-speech mode to said mode storage apparatus;

connection switching apparatus for connecting said communication network control apparatus with said speech communication apparatus if speech mode is set to said mode storage apparatus and for connecting said communication network control apparatus with said non-speech communication apparatus if non-speech mode is set to said mode storage apparatus;

schedule data storage apparatus for storing schedule data entered from said input apparatus; and timer apparatus for measuring time;

wherein, if said communication network control apparatus determines that said another party is communicating in said speech mode, said mode setting apparatus determines a utilizing situation of said another party based on a time measured by said timer apparatus and the schedule data stored in said schedule data storage apparatus and, according to the determined utilization situation, sets one of said speech mode and said non-speech mode to said mode storage apparatus, and, if said communication network control apparatus determines that said another party is communicating in said non-speech mode, said mode setting apparatus sets non-speech mode to said mode storage apparatus.

10. An information processing apparatus comprising:

communication network control apparatus for controlling connection with another party, said communication network control apparatus determining, based on information received after establishing a connection with said another party, whether said another party is communicating in a speech mode in which voice information is transferred or a non-speech mode in which data information is transferred;

non-speech communication apparatus for communicating in said non-speech mode in which data information other than voice information is transferred;

display apparatus for displaying data information;

voice input apparatus for entering a voice;

voice recognizing apparatus for converting voice information coming from said another party into data information;

connection switching apparatus for connecting said communication network control apparatus with said non-speech communication apparatus via said voice recognizing apparatus and connecting said communication network control apparatus with said voice input apparatus if said communication network control apparatus determines that said another party is communicating in said speech mode, and for connecting said communication network control apparatus with said non-speech communication apparatus directly if said communication network control apparatus determines that said another party is communicating in said non-speech mode;

speech communication apparatus for making communication in said speech mode in which voice information is transferred;

mode storage apparatus for storing any one of speech mode and non-speech mode;

mode setting apparatus for setting any one of speech mode and non-speech mode to said mode storage apparatus;

connection switching apparatus for connecting said communication network control apparatus with said speech communication apparatus if speech mode is set to said mode storage apparatus and for connecting said communication network control apparatus with said non-speech communication apparatus if non-speech mode is set to said mode storage apparatus;

schedule data storage apparatus for storing schedule data entered from said input apparatus; and timer apparatus for measuring time;

wherein, if said communication network control apparatus determines that said another party is communicating in said speech mode, said mode setting apparatus determines a utilizing situation of said another party based on a time measured by said timer apparatus and the schedule data stored in said schedule data storage apparatus and, according to the determined utilization situation, sets one of said speech mode and said non-speech mode to said mode storage apparatus, and, if said communication network control apparatus determines that said another party is communicating in said non-speech mode, said mode setting apparatus sets non-speech mode to said mode storage apparatus.

11. An information processing apparatus comprising:

communication network control apparatus for controlling connection with another party, said communication network control apparatus determining, based on information received after establishing a connection with said another party, whether said another party is communicating in a speech mode in which voice information is transferred or a non-speech mode in which data information is transferred;

non-speech communication apparatus for communicating in said non-speech mode in which data information other than voice information is transferred;

display apparatus for displaying data information;

voice input apparatus for entering a voice;

voice recognizing apparatus for converting voice information coming from said another party into data information;

connection switching apparatus for connecting said communication network control apparatus with said non-speech communication apparatus via said voice recognizing apparatus and connecting said communication network control apparatus with said voice input apparatus if said communication network control apparatus determines that said another party is communicating in said speech mode, and for connecting said communication network control apparatus with said non-speech communication apparatus directly if said communication network control apparatus determines that said another party is communicating in said non-speech mode;

communication information storage apparatus for storing any of voice information and data information, wherein said voice recognizing apparatus performs one of operations of storing at least part of voice information coming from said another party in said communication information storage apparatus based on an external instruction to convert the voice information stored in said communication information storage apparatus into data information and stores at least part of the converted data information in said communication information storage apparatus based on an external instruction to output the data information stored in said communication information storage apparatus onto said display apparatus;

speech communication apparatus for making communication in said speech mode in which voice information is transferred;

mode storage apparatus for storing any one of speech mode and non-speech mode;

mode setting apparatus for setting any one of speech mode and non-speech mode to said mode storage apparatus;

connection switching apparatus for connecting said communication network control apparatus with said speech communication apparatus if speech mode is set to said mode storage apparatus and for connecting said communication network control apparatus with said non-speech communication apparatus if non-speech mode is set to said mode storage apparatus;

schedule data storage apparatus for storing schedule data entered from said input apparatus; and timer apparatus for measuring time;

wherein, if said communication network control apparatus determines that said another party is communicating in said speech mode, said mode setting apparatus determines a utilizing situation of said another party based on a time measured by said timer apparatus and the schedule data stored in said schedule data storage apparatus and, according to the determined utilization situation, sets one of said speech mode and said non-speech mode to said mode storage apparatus, and, if said communication network control apparatus determines that said another party is communicating in said non-speech mode, said mode setting apparatus sets non-speech mode to said mode storage apparatus.

12. An information processing apparatus comprising:

communication network control apparatus for controlling connection with another party, said communication network control apparatus determining, based on information received after establishing a connection with said another party, whether said another party is communicating in a speech mode in which voice information is transferred or a non-speech mode in which data information is transferred;

non-speech communication apparatus for transferring data information other than voice information;

input apparatus for entering the data information;

display apparatus for displaying data information;

voice recognizing apparatus for converting voice information coming from said another party into data information;

voice synthesizing apparatus for converting said data information entered from said input apparatus into voice information;

connection switching apparatus for connecting said communication network control apparatus with said non-speech communication apparatus via said voice recognizing apparatus and connecting said communication network control apparatus with said voice input apparatus if said communication network control apparatus determines that said another party is communicating in said speech mode, and for connecting said communication network control apparatus with said non-speech communication apparatus directly if said communication network control apparatus determines that said another party is communicating in said non-speech mode;

wherein said input apparatus comprises handwritten character apparatus for entering handwritten character information and handwritten character recognizing apparatus for converting the handwritten character information entered from said handwritten character input apparatus into character code information;

speech communication apparatus for making communication in said speech mode in which voice information is transferred;

mode storage apparatus for storing any one of speech mode and non-speech mode;

mode setting apparatus for setting any one of speech mode and non-speech mode to said mode storage apparatus;

connection switching apparatus for connecting said communication network control apparatus with said speech communication apparatus if speech mode is set to said mode storage apparatus and for connecting said communication network control apparatus with said non-speech communication apparatus if non-speech mode is set to said mode storage apparatus;

schedule data storage apparatus for storing schedule data entered from said input apparatus; and timer apparatus for measuring time;

wherein, if said communication network control apparatus determines that said another party is communicating in said speech mode, said mode setting apparatus determines a utilizing situation of said another party based on a time measured by said timer apparatus and the schedule data stored in said schedule data storage apparatus and, according to the determined utilization situation, sets one of said speech mode and said non-speech mode to said mode storage apparatus, and, if said communication network control apparatus determines that said another party is communicating in said non-speech mode, said mode setting apparatus sets non-speech mode to said mode storage apparatus.

13. An information processing apparatus comprising:

communication network control apparatus for controlling connection with another party, said communication network control apparatus determining, based on information received after establishing a connection with said another party, whether said another party is communicating in a speech mode in which voice information is transferred or a non-speech mode in which data information is transferred;

non-speech communication apparatus for transferring data information other than voice information;

input apparatus for entering the data information;

display apparatus for displaying data information;

voice recognizing apparatus for converting voice information coming from said another party into data information;

voice synthesizing apparatus for converting said data information entered from said input apparatus into voice information;

connection switching apparatus for connecting said communication network control apparatus with said non-speech communication apparatus via said voice recognizing apparatus and connecting said communication network control apparatus with said voice input apparatus if said communication network control apparatus determines that said another party is communicating in said speech mode, and for connecting said communication network control apparatus with said non-speech communication apparatus directly if said communication network control apparatus determines that said another party is communicating in said non-speech mode;

wherein said input apparatus comprises handwritten character input apparatus for entering handwritten character information and handwritten character recognizing apparatus for converting the handwritten character information entered from said handwritten character input apparatus into character code information;

additional information detecting apparatus for detecting additional information attached when handwritten character information is entered from said handwritten character input apparatus, wherein said voice synthesizing apparatus changes an attribute of voice information to be synthesized according to contents of the additional information detected by said additional information detecting apparatus;

speech communication apparatus for making communication in said speech mode in which voice information is transferred;

mode storage apparatus for storing any one of speech mode and non-speech mode;

mode setting apparatus for setting any one of speech mode and non-speech mode to said mode storage apparatus, connection switching apparatus for connecting said communication network control apparatus with said speech communication apparatus if speech mode is set to said mode storage apparatus and for connecting said communication network control apparatus with said non-speech communication apparatus if non-speech mode is set to said mode storage apparatus;

schedule data storage apparatus for storing schedule data entered from said input apparatus; and timer apparatus for measuring time;

wherein, if said communication network control apparatus determines that said another party is communicating in said speech mode, said mode setting apparatus determines a utilizing situation of said another party based on a time measured by said timer apparatus and the schedule data stored in said schedule data storage apparatus and, according to the determined utilization situation, sets one of said speech mode and said non-speech mode to said mode storage apparatus, and, if said communication network control apparatus determines that said another party is communicating in said non-speech mode, said mode setting apparatus sets non-speech mode to said mode storage apparatus.

14. An information processing apparatus as defined in claim 5, further comprising:

schedule data storage apparatus for storing schedule data entered from said input apparatus; and timer apparatus for measuring time;

wherein, if said communication network control apparatus determines that the other party communicates in said speech mode, said mode setting apparatus determines utilizing situation of the other party based on a time measured by said timer apparatus and the schedule data stored in said schedule data storage apparatus and, according to the determined utilization situation, sets one of said speech mode and said non-speech mode to said mode storage apparatus, and, if said communication network control apparatus determines that the other party communicates in said non-speech mode, said mode setting apparatus sets non-speech mode to said mode storage apparatus.

* * * * *

UNITED STATES PATENT AND TRADEMARK OFFICE
CERTIFICATE OF CORRECTION

PATENT NO. : 5,687,221
DATED : November 11, 1997
INVENTOR(S) : OHEDA, et al.

It is certified that error appears in the above-identified patent and that said Letters Patent is hereby corrected as shown below:

On the Title Page, left-hand column insert:

—[30]  Foreign Application Priority Data
       September 9, 1993 [JP]   Japan ............5-224706—

Signed and Sealed this

Seventeenth Day of February, 1998

Attest:

BRUCE LEHMAN

*Attesting Officer*          *Commissioner of Patents and Trademarks*